United States Patent
Umaki et al.

(10) Patent No.: US 8,535,159 B2
(45) Date of Patent: Sep. 17, 2013

(54) INFORMATION PROCESSING METHOD AND SERVER SYSTEM

(75) Inventors: Takashi Umaki, Saitama (JP); Kunihiko Minakata, Yokohama (JP); Kazuo Takahashi, Tokyo (JP); Hironori Ikeda, Tokyo (JP)

(73) Assignee: Namco Bandai Games Inc., Tokyo (JP)

( * ) Notice: Subject to any disclaimer, the term of this patent is extended or adjusted under 35 U.S.C. 154(b) by 513 days.

(21) Appl. No.: 12/368,613

(22) Filed: Feb. 10, 2009

(65) Prior Publication Data

US 2009/0209351 A1 Aug. 20, 2009

(30) Foreign Application Priority Data

Feb. 14, 2008 (JP) ................................. 2008-033846

(51) Int. Cl.
*A63F 9/24* (2006.01)
(52) U.S. Cl.
USPC ............................................................ 463/42
(58) Field of Classification Search
USPC ..................................................... 463/40–42
See application file for complete search history.

(56) References Cited

U.S. PATENT DOCUMENTS

| | | | | |
|---|---|---|---|---|
| 6,676,521 | B1 * | 1/2004 | La Mura et al. | 463/42 |
| 2002/0086733 | A1 * | 7/2002 | Wang | 463/42 |
| 2005/0164792 | A1 | 7/2005 | Wilcock | |
| 2007/0156267 | A1 * | 7/2007 | Nozaki | 700/91 |
| 2008/0176619 | A1 * | 7/2008 | Kelly et al. | 463/16 |

FOREIGN PATENT DOCUMENTS

| | | |
|---|---|---|
| JP | A-2006-006853 | 1/2006 |
| JP | A-2006-081674 | 3/2006 |

OTHER PUBLICATIONS

TEKKEN-NET, *Coin Operated Videogame Magazine Arcadia*, No. 91, p. 25, Dec. 1, 2007 (with translation).
TEKKEN-NET, *Coin Operated Video Magazine Arcadia*, No. 92, p. 49, Jan. 1, 2008 (with translation).
New U.S. Patent Application filed Feb. 10, 2009, filed in the name of Takashi Umaki et al.
TEKKEN-Newsletter, *Coin Operated Video Magazine Arcadia*, No. 92, p. 49, Jan. 1, 2008, (with translation).
Aug. 2, 2011 Notice of Allowance issued in U.S. Appl. No. 12/368,664.

* cited by examiner

*Primary Examiner* — Yu-Hsi D Sun
(74) *Attorney, Agent, or Firm* — Oliff & Berridge, PLC

(57) ABSTRACT

A league is formed by a given number of teams formed by a plurality of players and having an identical team level, and the teams compete for league ranking based on team points obtained in a given period. A team level of each team is changed based on the league ranking. The player plays a game using a game device to obtain the team points.

15 Claims, 34 Drawing Sheets

* TEAM POINTS=(BASE POINTS) × N+(TRIAL POINTS)

FIG. 20

- TRIAL DESCRIPTION SCREEN 1

| TRIAL |
|---|
| TRIAL DESCRIPTION |
| ◆ TRIAL 1 <br> ................... <br> · (EXPLANATION OF TRIAL 1) <br> ................... <br><br> CHALLENGE THIS TRIAL? <br><br> CHALLENGE <br><br><br> RETURN |

FIG. 21

- TRIAL DESCRIPTION SCREEN 2

| TRIAL |
|---|
| TRIAL DESCRIPTION |
| ◆ TRIAL 1 <br> ................... <br> · (EXPLANATION OF TRIAL 1) <br> ................... <br><br> CANCEL TRIAL IN PROGRESS, AND CHALLENGE THIS TRIAL? <br><br> CHALLENGE <br><br><br> RETURN |

FIG. 25

| TRIAL ID | TRIAL NAME | CLEAR CONDITION | RANK |
|---|---|---|---|
| t001 | SUPERSESSION ! | DEFEATS ANOTHER PLAYER HAVING LEVEL HIGHER THAN PLAYER BY THREE OR MORE LEVELS | S |
| t002 | STORE CHAMPION ! | DEFEATS PLAYER HAVING THE MAXIMUM LEVEL IN STORE | |
| ⋮ | ⋮ | ⋮ | |
| t101 | COMBO EXPERT | SUCCEEDS IN COMBO $\alpha$ FIVE TIMES | A |
| ⋮ | ⋮ | ⋮ | |
| t201 | JUST BEFORE TIME-OUT | WINS GAME WITHIN 10 SECONDS BEFORE GAME OVER | B |
| ⋮ | ⋮ | ⋮ | |
| t301 | KNOCKOUT | KNOCKOUT BY HITTING | C |
| ⋮ | ⋮ | ⋮ | |

TRIAL LIST TABLE

FIG. 27

LEAGUE SERIES DATA

346a — LEAGUE ID | R7777    346b (MATCH RECORD DATA)

| INTERVAL | | TEAM POINTS | INTERVAL RANKING |
|---|---|---|---|
| MONDAY | DAYTIME | 125 | THIRD |
| | NIGHT-TIME | 498 | SECOND |
| TUESDAY | DAYTIME | 86 | FOURTH |
| | NIGHT-TIME | — | — |
| ⋮ | ⋮ | ⋮ | ⋮ |
| SUNDAY | DAYTIME | — | — |
| | NIGHT-TIME | — | — |
| ENTIRE INTERVAL | | TEAM POINTS | INTERVAL RANKING |

FIG. 28

| COMMAND VOTE STATUS DATA 347a | TEAM COMMAND 347 | VOTING PLAYER 347b | TOTAL VOTES CAST 347c | |
|---|---|---|---|---|
| ATTACK | TEAM A | PLAYER $\alpha 1, \alpha 3$ | 2 | 7 |
| | TEAM B | PLAYER $\alpha 6$ | 1 | |
| | TEAM C | — | 0 | |
| | TEAM D | PLAYER $\alpha 2, \alpha 5, \alpha 8$ | 3 | |
| | TEAM E | PLAYER $\alpha 11$ | 1 | |
| INTERCEPT | | PLAYER $\alpha 7, \alpha 9, \alpha 10$ | 3 | |
| BOOST | | PLAYER $\alpha 4$ | 1 | |

FIG. 29

LEVEL CHANGE CONDITION TABLE 364

| TEAM LEVEL (364a) | CHANGE CONDITION (364b) |
|---|---|
| 1 | TEAM POINTS: 0 ~ 99 |
| 2 | TEAM POINTS: 100 ~ 199 |
| 3 | TEAM POINTS: 200 ~ 399 |
| 4 | TEAM POINTS: 400 ~ 999 |
| 5 | TEAM POINTS: 1000 ~ |
| 5 | LEAGUE POINTS: ~ 1 |
| 6 | LEAGUE POINTS: 2 ~ 3 |
| 7 | LEAGUE POINTS: 4 ~ 5 |
| 8 | LEAGUE POINTS: 6 ~ 7 |
| 9 | LEAGUE POINTS: 8 ~ 9 |
| 10 | LEAGUE POINTS: 10 ~ |

FIG. 30

COMMAND RELATIVE RELATIONSHIP TABLE 361

| TEAM COMMAND (361a) | SUCCESS/FAILURE CONDITION (361b) | RESULT (361c) | CHANGE TARGET TEAM (361d) | CALCULATION COEFFICIENT N (361e) |
|---|---|---|---|---|
| ATTACK | TARGET TEAM ATTACKS ANOTHER TEAM | SUCCESS | TARGET TEAM | 0.75 |
| ATTACK | ATTACKED BY TARGET TEAM | FAILURE | PLAYER'S TEAM | 0.7 |
| ATTACK | INTERCEPTED BY TARGET TEAM | FAILURE | PLAYER'S TEAM | 0.5 |
| INTERCEPT | ATTACKED BY ANOTHER TEAM | SUCCESS | ATTACKED TEAM | 0.7 |
| INTERCEPT | NOT ATTACKED BY ANOTHER TEAM | FAILURE | PLAYER'S TEAM | 0.9 |
| BOOST | NOT ATTACKED BY ANOTHER TEAM | SUCCESS | PLAYER'S TEAM | 1.2 |
| BOOST | ATTACKED BY ANOTHER TEAM | FAILURE | PLAYER'S TEAM | 0.7 |

FIG. 31

LEAGUE DATA 348a / 348 / 348b / 348c

| LEAGUE ID | TEAM | | TEAM LEVEL |
|---|---|---|---|
| R1111 | TEAM A | TEAM α | 5 |
| | TEAM B | TEAM β | 5 |
| | TEAM C | TEAM θ | 5 |
| | TEAM D | TEAM χ | 5 |
| | TEAM E | TEAM φ | 5 |
| ⋮ | ⋮ | ⋮ | ⋮ |

FIG. 32

LEAGUE POINT TABLE 362a / 362 / 362b

| LEAGUE RANKING | CHANGE IN LEAGUE POINTS |
|---|---|
| 1 | +3 |
| 2 | +1 |
| 3 | 0 |
| 4 | −1 |
| 5 | −2 |

FIG. 33

| FIGHT MONEY TABLE 365a — LEAGUE RANKING | 365b — TEAM LEVEL | 365c — FIGHT MONEY |
|---|---|---|
| 1 | 5 | 3000G |
| | 6 | 3200G |
| | 7 | 3500G |
| | ⋮ | ⋮ |
| | 10 | 6000G |
| 2 | 5 | 2800G |
| | 6 | 2500G |
| | ⋮ | ⋮ |
| ⋮ | ⋮ | ⋮ |
| 5 | 5 | 1000G |
| | 6 | 1200G |
| | ⋮ | ⋮ |

FIG. 36

BASE POINT TABLE

(MATCH POINT TABLE)

| MATCH TYPE | MATCH POINTS |
|---|---|
| CPU MATCH | 5 |
| PLAYER MATCH | 10 |

(WIN POINT TABLE)

| RELATIVE LEVEL DIFFERENCE | WIN POINTS |
|---|---|
| +3 OR MORE | 50 |
| +2 | 40 |
| +1 | 30 |
| 0 | 20 |
| −1 | 15 |
| −2 | 10 |
| −3 OR LESS | 5 |

*RELATIVE LEVEL DIFFERENCE = (LEVEL OF OPPONENT PLAYER) − (LEVEL OF PLAYER)

(BONUS POINT TABLE)

| WIN CONDITION | BONUS POINTS |
|---|---|
| SUCCESSIVE VICTORIES | 5 |
| KNOCKOUT | 5 |

FIG. 37

TRIAL POINT TABLE 183a    183    183b

| TRIAL RANK | TRIAL POINTS |
|---|---|
| C | 100 |
| B | 200 |
| A | 300 |
| S | 500 |

INFORMATION PROCESSING METHOD AND SERVER SYSTEM

Japanese Patent Application No. 2008-33846 filed on Feb. 14, 2008, is hereby incorporated by reference in its entirety.

BACKGROUND

The present invention relates to a server system, a game device, and an information processing method.

When a player plays a game using an arcade game device, the player generally enjoys only one game upon insertion of coins or tokens corresponding to a specific amount. A game system using a player ID card has been developed in order to utilize the total game play of the player including the previous game play. Such a game system has become popular.

In this type of game system, a game device provided with a card reader that can read data from and write data into a player ID card and a server system are connected via a communication channel. When the player plays the game using an arbitrary game device utilizing the player ID card, player points are awarded to the player corresponding to victory or defeat and the like. The server system sums up and manages the player points corresponding to each player ID. The player is notified of nationwide ranking and the like. JP-A-2006-006853 discloses such a game system, for example.

The player enjoys only one game play when using such a game device. However, novel game playability is achieved by collecting each game play corresponding to each player to create player ranking. The correlation (connection) between game play and player ranking is widely known.

However, since player ranking connected with game play using the game device is aimed at each player, a plurality of players do not cooperate to play the game. Therefore, game playability is limited.

SUMMARY

According to one aspect of the invention, there is provided an information processing method implemented by a server system connected to a game device via a communication channel, the game device allowing a player to play a game, the information processing method comprising:

receiving notification information based on game play that has been performed from the game device;

updating player points of each player based on the received notification information, and managing the player points;

ranking each player based on the player points;

managing a plurality of teams while storing players of each of the plurality of teams; and matching teams among the plurality of teams to form a plurality of groups, each of the plurality of groups being formed by a plurality of teams, and performing a team competition process that allows the plurality of teams of each of the plurality of groups to compete for ranking based on the notification information after each of the players has played the game.

BRIEF DESCRIPTION OF THE DRAWINGS

FIG. 20 shows an example of a trial description screen.
FIG. 21 shows another example of a trial description screen.
FIG. 25 shows a data configuration example of a trial list table.
FIG. 27 shows a data configuration example of league series data.
FIG. 28 shows a data configuration example of command vote status data.
FIG. 29 shows a data configuration example of a level change condition table.
FIG. 30 shows a data configuration example of a command relative relationship table.
FIG. 31 shows a data configuration example of league data.
FIG. 32 shows a data configuration example of a league point table.
FIG. 33 shows a data configuration example of a fight money table.
FIG. 36 shows a data configuration example of a base point table.
FIG. 37 shows a data configuration example of a trial point table.

DESCRIPTION OF EXEMPLARY EMBODIMENTS

Figure 1:
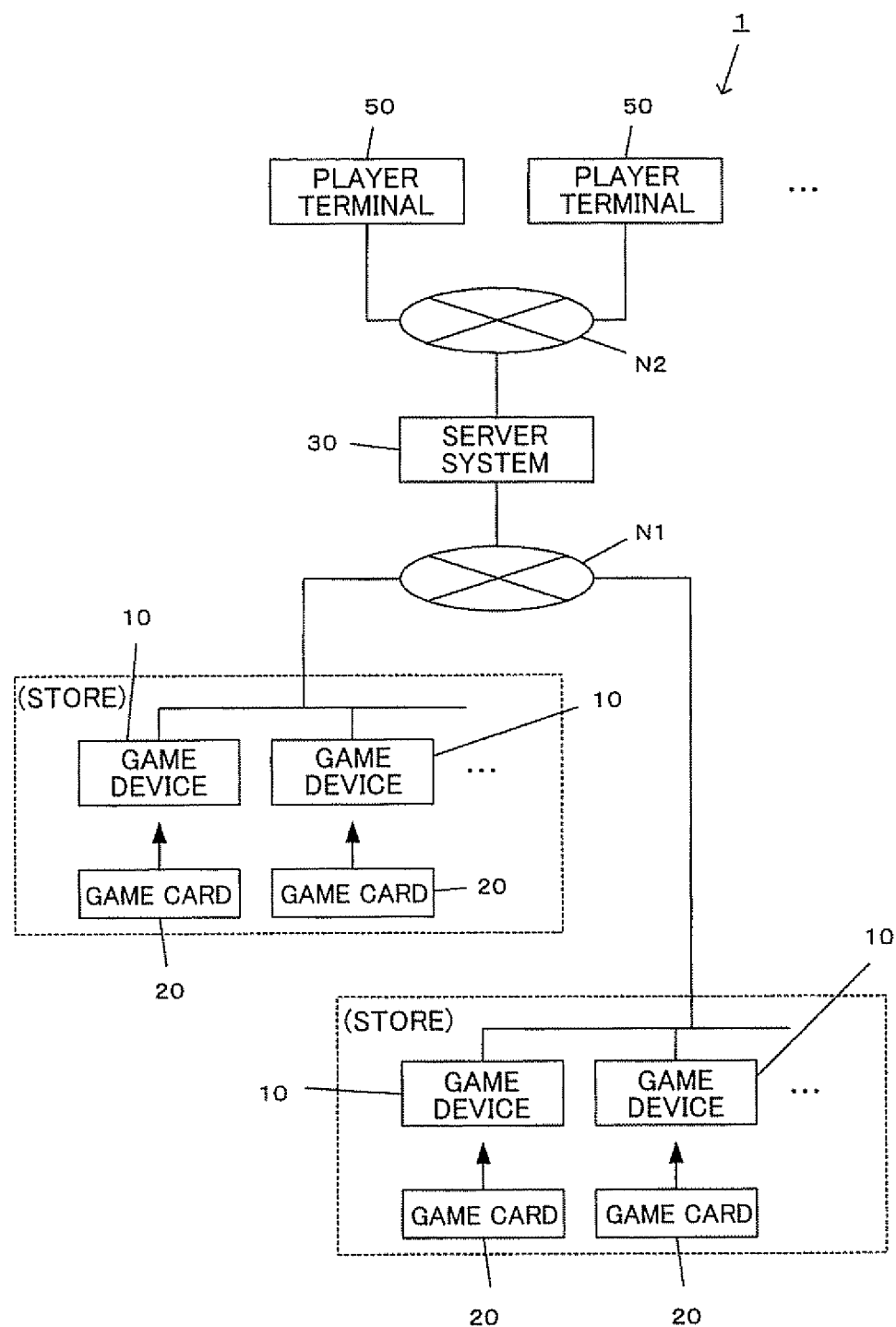
FIG. 1 is a configuration diagram showing a game system.

One embodiment of the invention relates to a server system connected to a game device via a communication channel, the game device allowing a player to input player identification information and play a game, the server system comprising a player identification information reception section that receives the player identification information from the game device;

a notification information reception section that receives notification information from the game device, the notification information being calculated by the game device based on game play that has been performed by a player;

a player point management section that updates player points of each player based on the notification information received by the notification information reception section and manages the player points;

a player ranking section that ranks each player based on the player points;

a team management section that manages a plurality of teams while associating a plurality of players with each of the plurality of teams; and a team competition processing section that matches a plurality of teams among the plurality of teams managed by the team management section to form a plurality of groups, each of the plurality of groups being formed by a plurality of teams, and performs a team competition process that allows the plurality of teams included in each of the plurality of groups to compete based on the notification information calculated after each player belonging to each of the plurality of teams has played the game.

Another embodiment of the invention relates to an information processing method implemented by a server system connected to a game device via a communication channel, the game device allowing a player to input player identification information and play a game, the information processing method comprising:

a player identification information reception step that receives the player identification information from the game device;

a notification information reception step that receives notification information from the game device, the notification information being calculated by the game device based on game play that has been performed by a player;

a player point management step that updates and manages player points of each player based on the notification information received by the notification information reception step;

a player ranking step that ranks each player based on the player points;

a team management step that manages a plurality of teams while associating a plurality of players with each of the plurality of teams; and a team competition processing step that matches a plurality of teams among the plurality of teams managed by the team management step to form a plurality of groups, each of the plurality of groups being formed by a plurality of teams, and performs a team competition process that allows the plurality of teams included in each of the plurality of groups to compete based on the notification information calculated after each player belonging to each of the plurality of teams has played the game.

According to the above configuration, player ranking is calculated in connection with game play performed using the game device and provided to the player and the team competition process is also performed. Specifically, the players are managed corresponding to each team, and the teams are matched to form a plurality of groups. The teams in each group compete based on game play performed by each player belonging to each team (team competition process).

The player can enjoy each game play using the game device. Moreover, player ranking and team ranking in each group change based on game play. Therefore, a system that provides game play using the game device with novel interest to improve game playability can be provided. Since the teams compete in each group formed by matching, the opponent teams are specified. Therefore, a system that can encourage rivalry between the teams can be provided.

In the above server system, the team management section may include a team point management section that manages team points of each of the plurality of teams while changing the team points of a team to which a player identified by the player identification information received by the player identification information reception section belongs based on the notification information received by the notification information reception section, and the team competition processing section may perform the team competition process on a team that satisfies a given condition determined based on the team points managed by the team point management section.

According to the above configuration, the team points of each team are changed and managed based on game play of the player belonging to each team. The team competition process is performed on the team for which the team points satisfy the given condition. Specifically, the team competition process is not performed on all of the teams. For example, a nominal team can be excluded from the target of the team competition process by determining whether or not the team points are equal to or larger than a given value (given condition). If the team point update frequency (e.g., whether or not the team points have been updated within one month) is set as the given condition, a team in which no player has played the game can be excluded from the target of the team competition process.

The above server system may further comprise a team ranking section that ranks the plurality of teams including a team for which the team points satisfy the given condition and a team for which the team points do not satisfy the given condition based on the team points.

According to the above configuration, team ranking based on the team points can also be implemented. Therefore, a system that can make game play using the game device more interesting can be provided.

In the above server system, the team management section may include a team level management section that variably manages a team level of each of the plurality of teams based on ranking in each of the plurality of groups based on the team competition process, and the team competition processing section may match teams having an identical team level from the plurality of teams.

According to the above configuration, the teams having an identical team level are matched to form a group, and the team competition process is performed. Therefore, the team competition process is performed on the teams having a similar capability. In the team competition process, the teams do not directly play a match. Specifically, the teams indirectly compete based on results obtained by collecting game play performed by each player using the game device corresponding to each team. Therefore, since the teams indirectly compete based on game play performed by each player belonging to each team, an interesting competition can be implemented.

In the above server system, the team competition processing section may repeat the team competition process at given intervals.

According to the above configuration, since the team competition process is repeated instead of temporarily performing the team competition process, opponent teams are matched and changed corresponding to each period (interval) so that the player can continuously enjoy competition between the teams in the group.

In the above server system, the game device may include a point calculation section that calculates determination points based on game play results by a predetermined calculation process, the notification information may include at least the determination points calculated by the point calculation section, and the team competition processing section may calculate the ranking of each of the plurality of teams in each of the plurality of groups based on a sum of the determination points included in the notification information corresponding to each of the plurality of teams.

Another embodiment of the invention relates to a game device that can communicate with the above server system and allows a player to input player identification information and play a game, the game device comprising:

a point calculation section that calculates determination points based on game play results by a predetermined calculation process; and a transmission section that transmits the determination points calculated by the point calculation section to the server system.

According to the above configuration, the determination points are calculated by the game device from the game play results and transmitted to the server system, and the ranking of each team in the group is determined based on the sum of the determination points corresponding to each team.

In the above server system, the game device may further include a condition determination section that determines whether or not a bonus point condition is satisfied based on game play and/or game play results of a player, the bonus point condition being a condition that can be satisfied during game play or as game play results, bonus points being awarded to a team to which a player who satisfies the bonus point condition belongs.

the point calculation section of the game device may calculate the determination points by adding the bonus points to the determination points when the condition determination section has determined that the bonus point condition is satisfied, and the server system may further comprise:

a bonus point condition setting section that performs a given communication with a player terminal and sets the bonus point condition for a player; and a bonus point condition transmission section that transmits the bonus point condition set for a player identified by the player identification information received by the player identification information reception section to the game device.

According to the above configuration, whether or not the bonus point condition is satisfied is determined based on game play performed by the player using the game device and/or game play results. When the bonus point condition is satisfied, the bonus points are added to the determination points of the team. The player normally plays the game using the game device. Whether or not to award the bonus points to the player is determined based on game play and/or game play results. This implements a more interesting game without changing the game performed using the game device.

The above server system may further comprise:

a team command selection section that selects a team command corresponding to each of the plurality of teams from a plurality of team commands for which a success/failure relative relationship has been specified;

a calculation coefficient setting section that variably sets a calculation coefficient based on team commands for each team that belongs to an identical group among the team commands corresponding to each of the plurality of teams selected by the team command selection section and the success/failure relative relationship, the calculation coefficient being used when the point calculation section of the game device calculates the determination points based on game play results; and a calculation coefficient transmission section that transmits the calculation coefficient set by the calculation coefficient setting section to the game device.

According to the above configuration, the calculation coefficient used when calculating the determination points based on game play results is changed based on the relative relationship between the team commands for the teams selected from the plurality of team commands for which the success/failure relative relationship has been specified. This implements a more interesting game in which the determination points are not merely calculated based on game play results.

In the above server system, the team competition processing section may include a point calculation section that calculates determination points based on the notification information by a predetermined calculation process, and may calculate the ranking of each of the plurality of teams in each of the plurality of groups based on a sum of the determination points calculated by the point calculation section.

According to the above configuration, the determination points are calculated based on the notification information calculated based on game play and transmitted from the game device, and the ranking of each team in the group is determined based on the sum of the determination points corresponding to each team.

The above server system may further comprise:

a bonus point condition setting section that performs a given communication with a player terminal and sets a bonus point condition for a player, the bonus point condition being a condition that can be satisfied during game play or as game play results, bonus points being awarded to a team to which a player who satisfies the bonus point condition belongs, and the point calculation section may determine whether or not the bonus point condition set for a player identified by the player identification information received by the player identification information reception section is satisfied based on the notification information received by the notification information reception section, and calculate the determination points by adding the bonus point to the determination points when the bonus point condition is satisfied.

According to the above configuration, whether or not the bonus point condition is satisfied is determined based on game play performed by the player using the game device and/or game play results. When the bonus point condition is satisfied, the bonus points are added to the determination points of the team. The player normally plays the game using the game device. Whether or not to award the bonus points to the player is determined based on game play and/or game play results. This implements a more interesting game without changing the game using the game device.

The above server system may further comprise:

a team command selection section that selects a team command corresponding to each of the plurality of teams from a plurality of team commands for which a success/failure relative relationship has been specified; and a calculation coefficient setting section that variably sets a calculation coefficient based on team commands for each team that belongs to an identical group among the team commands corresponding to each of the plurality of teams selected by the team command selection section and the success/failure relative relationship, the calculation coefficient being used when the point calculation section of the game device calculates the determination points based on game play results; and the point calculation section may calculate the determination points using the calculation coefficient set by the calculation coefficient setting section.

According to the above configuration, the calculation coefficient used when calculating the determination points is changed based on the relative relationship between the team commands for the teams selected from the plurality of team commands for which the success/failure relative relationship has been specified. This implements a more interesting game in which the determination points are not merely calculated based on the notification information.

In the above server system, the team command selection section may select the team command of each of the plurality of teams by a majority decision of the players belonging to each of the plurality of teams based on vote signals transmitted from player terminals of the players belonging to each of the plurality of teams.

According to the above configuration, the team command of each team is selected by a majority decision based on the vote signals transmitted from the player terminals of the players belonging to each team. Therefore, the team command can be selected as a consensus of the team.

In the above server system, the team competition processing section may include a subtotal section that calculates a subtotal of the determination points corresponding to each team at intervals shorter than the given intervals; and the server system may further comprise a transmission section that transmits a signal to the game device, the signal displaying a sum of the determination points on the game device in a latest interval in which the subtotal section calculates the subtotal of the determination points corresponding to each team in the group to which the team of a player identified by a player identification signal received by the player identification information reception section belongs.

According to the above configuration, the player can be notified of the team competition process using the game device used to play the game. However, the cumulative value of the determination points of each team in the group is not displayed. Specifically, the determination points in the latest interval which is shorter than the given intervals of the team competition processes and in which the subtotal of the determination points is calculated are displayed. Specifically, the player can be notified of the point status of each team in the current interval, but cannot be notified of the total points obtained over the entire period in which the team competition process is performed. If the total points obtained over the entire period are displayed, the morale of the team may fall depending on the point difference. Moreover, the player may not enjoy each game play using the game device.

Preferred embodiments of the invention are described below with reference to the drawings. The following description illustrates example in which a fighting game is executed in a network game system. Note that embodiments to which the invention can be applied are not limited thereto.

Configuration

FIG. 1 is a configuration diagram showing a game system 1 according to one embodiment of the invention. As shown in FIG. 1, the game system 1 is a network game system that includes a plurality of game devices 10, a server system 30, and a player terminal 50. The server system 30 and the game device 10 are connected via a communication line N1 so that the server system 30 and the game device 10 can communicate. The server system 30 and the player terminal 50 are connected via a communication line N1 so that the server system 30 and the player terminal 50 can communicate. The communication lines N1 and N2 are communication channels through which data can be exchanged. Specifically, the communication lines N1 and N2 include a communication network such as a LAN using a private line (private cable) for direct connection, Ethernet (registered trademark), and the like, a telecommunication network, a cable network, and the Internet. The communication method may be a cable communication method or a wireless communication method. The communication lines N1 and N2 may be different communication networks or an identical communication network.

The game device 10 is a terminal device that allows the player to play the game. Specifically, the game device 10 is an arcade game device installed in a store such as an arcade. The game devices 10 installed in an identical store are connected via a LAN or the like provided in the store. The game device 10 reads a card ID recorded in a game card 20 inserted into a housing, transmits the card ID to access the server system 30, and logs into the game system 1. The game card 20 is provided to the player in advance by selling or the like. For example, the game card 20 is implemented by an IC card that includes an IC chip that stores data such as a specific card ID.

The server system 30 is a server system formed by a server computer. For example, the server system 30 is installed on the side of the game manufacturer. The server system 30 mainly functions (1) as a game server that manages the game in the game system 1, and (2) as a web server that provides the player who has registered the game card 20 used in the game with a service connected with the game executed in the game system 1 on a homepage (HP) via the Internet. Note that the server system 30 may include a plurality of server computers.

The player terminal 50 is a terminal device that allows the player to enjoy the service provided by the server system 30. Specifically, the player terminal 50 is a portable telephone or a personal computer possessed by the player. The player can enjoy the service provided by the server system 30 by starting a browser program and accessing the homepage maintained by the server system 30 using the player terminal Principle The game system 1 executes a fighting game. In the fighting game, the player can enjoy a "player match" in which the player plays a match against another player who enjoys the game in the store and a "CPU match" in which the player plays a match against a CPU character. The player obtains player points and fight money corresponding to the results of game play using the game device 10. The term "fight money" refers to virtual money for the player to purchase clothes, accessories, and the like used to customize a player character. The term "player points" refers to a value that ranks the player. Player ranking is calculated based on the sum of the player points obtained by each player.

In this embodiment, a team is formed by a plurality of players, and team ranking is calculated corresponding to each team. Team ranking is calculated based on the sum of team points obtained by the players belonging to each team. The team points are obtained corresponding to the results of game play of the player. The team points are calculated according to a standard differing from that for the player points. Specifically, the player obtains fight money, the player points for the player, and the team points for the player team by playing the game.

Figure 2:
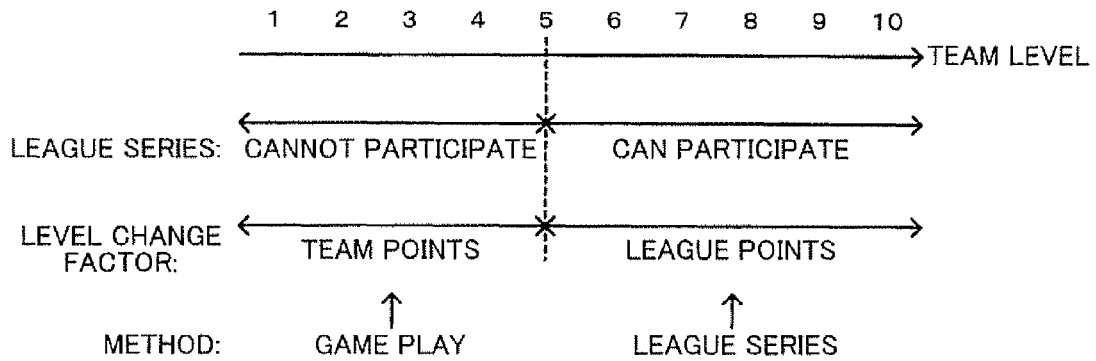
FIG. 2 is a view illustrative of a change in team level.

A level (team level) is specified for each team. The lowest team level is "1". The team level is changed between the lowest level "1" and the highest level "10". FIG. 2 is a view illustrative of a change in team level. As shown in FIG. 2, when the team level is between "1" and "55", the team level is changed corresponding to the sum of the team points that have been obtained. The team points obtained by the player have a positive value. Specifically, the sum of the team points of each team necessarily increases. Therefore, the team level is increased up to "5". When the team level has reached "5", the team can participate in a league series, and the team level is changed corresponding to league points that are changed corresponding to the results in the league series. The league points are increased/decreased corresponding to the team's results in the league series. Therefore, the team level is increased/decreased between "5" and "10". Note that the team level is not decreased to a value less than "5" after the team level has reached "5".

Figure 3:
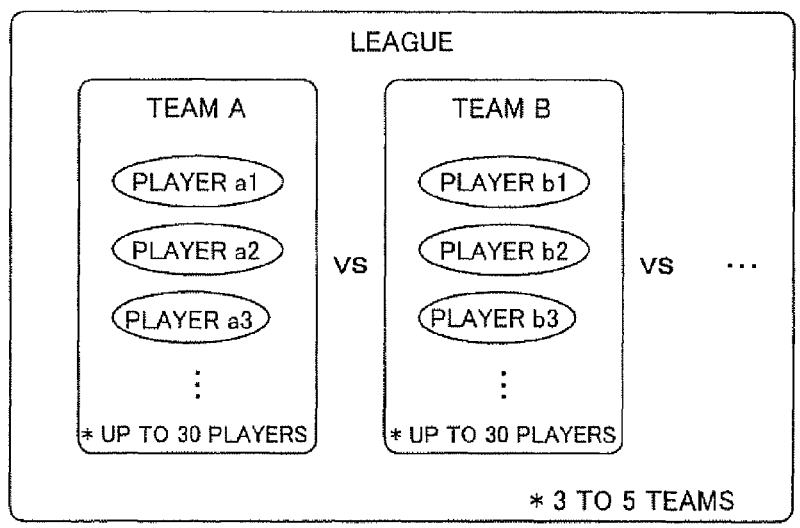
FIG. 3 is a view showing an outline of a league series.

FIG. 3 is a view illustrative of an outline of the league series. As shown in FIG. 3, a league is formed by combining a plurality of (three to five) teams. Each team in the league is ranked based on the sum of the team points obtained by the players belonging to each team.

Figure 4:
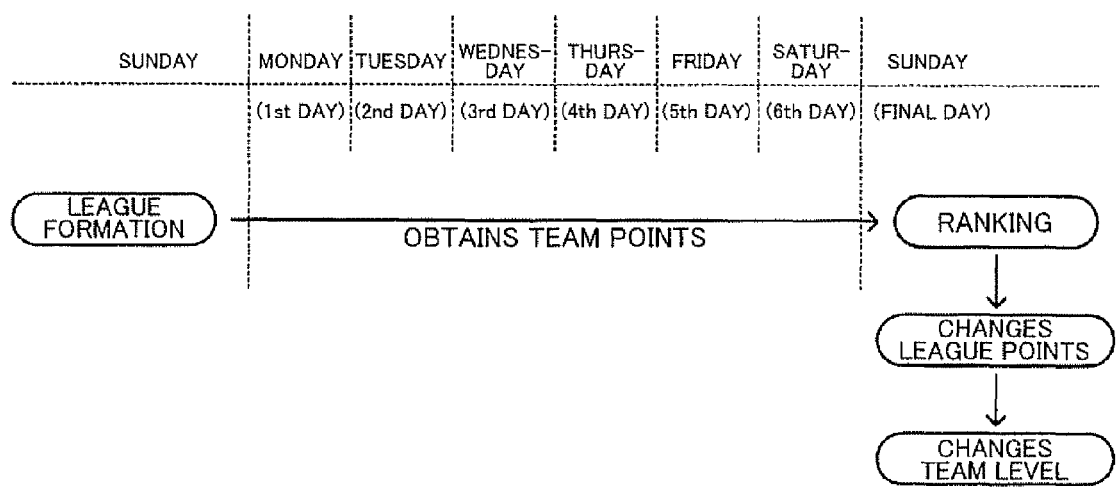
FIG. 4 is a view illustrative of a league series period.

The league series is held over a predetermined unit period (e.g., one week). FIG. 4 is a view illustrative of an outline of the league series period. As shown in FIG. 4, the league series is held over one week (seven days) from Monday to Sunday. Specifically, the league is formed on Sunday. The player plays the game from the next day (Monday) to Sunday to obtain team points. Ranking (league ranking) is determined on Sunday (final day) based on the sum of the team points obtained this week (series period). The league points of each team are changed corresponding to league ranking, and the team level is changed corresponding to the change in league points.

Figure 5:
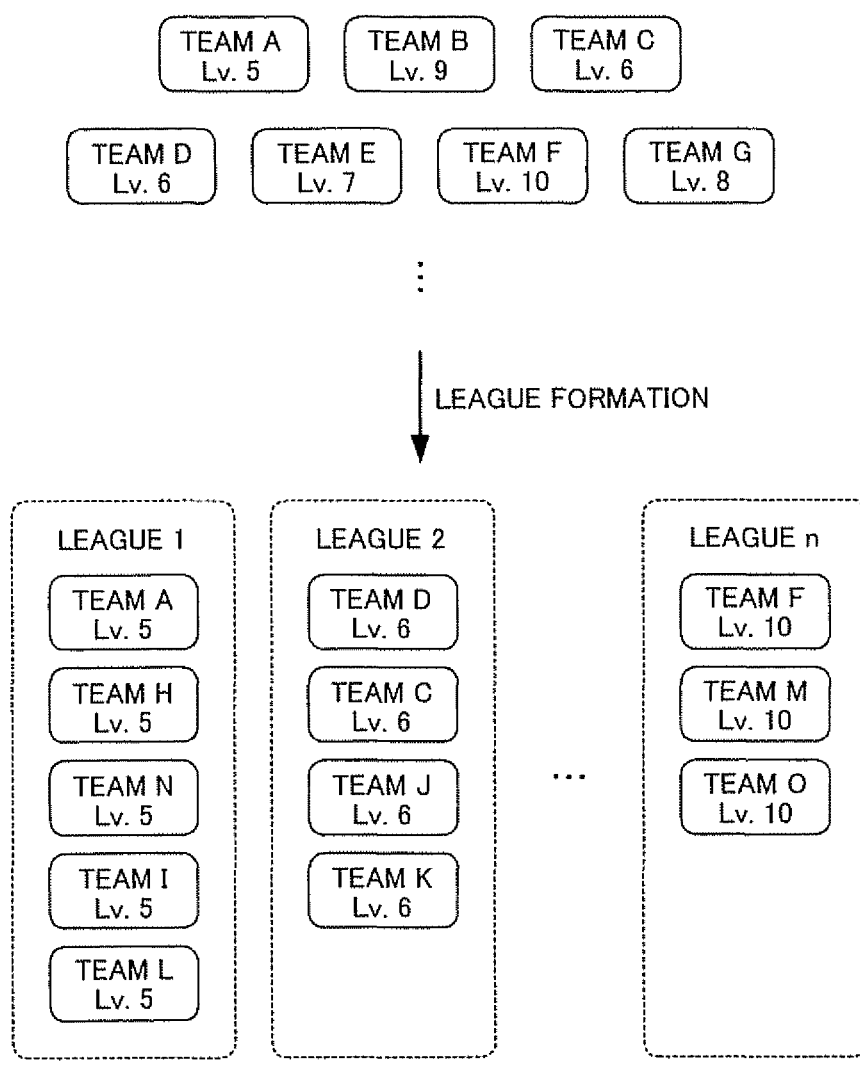
FIG. 5 is a view illustrative of league formation.

FIG. 5 is a view illustrative of league formation. As shown in FIG. 5, each league is formed by matching teams having an identical team level. Note that each league is formed by teams having a team level equal to or higher than "5" (i.e., teams that can participate in the league series). One league is basically formed by five teams having an identical team level. However, when the number of teams having an identical team level is less than five, one league is formed by three or four teams. For example, when the number of remaining teams is two or less as a result of matching five teams having an identical team level corresponding to each league, one league is necessarily formed by three or more teams, such as forming two leagues by four teams, respectively, or forming one league by three teams. When the number of teams having an identical team level is two or less, a league is formed by combining teams that differ in team level by one.

The team points are calculated by "base points×N÷trial points" corresponding to each game play using the game device 10 based on the results of the game play. The base points are obtained by playing the game. The base points mainly include participation points and win points.

The calculation coefficient N is a parameter that increases or decreases the base points, and is specified corresponding to each team. The calculation coefficient N is initially set at 1.0 (initial value). The calculation coefficient N is changed corresponding to a team command issued by each team. Specifically, a plurality of types of team commands are provided, and the success/failure relative relationship between the types is defined in advance. The calculation coefficient N of each team is changed corresponding to the success/failure relative relationship between the team commands issued by each team.

Figure 6:
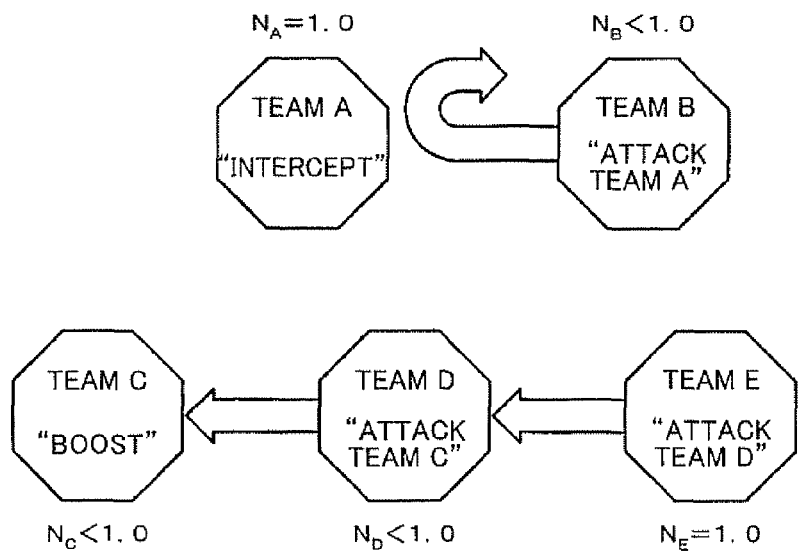
FIG. 6 is a view illustrative of the team command relative relationship.

FIG. 6 is a view showing the team command success/failure relative relationship. As shown in FIG. 6, the team commands include an attack command, an intercept command, and a boost command. The success/failure relative relationship between the team commands is defined as follows. The attack command instructs the team to attack another team. The team succeeds in operation if the team is not intercepted by the attack target team. In this case, the calculation coefficient N of the attack target team is reduced to a value less than 1.0. The team fails in operation if the team is intercepted by the attack target team. In this case, the calculation coefficient N of the team is reduced to a value less than 1.0. The intercept command instructs the team to intercept another team. The team succeeds in operation if the team is attacked by another team. In this case, the calculation coefficient N of the team that has made an attack is reduced to a value less than 1.0. The team fails in operation if the team is not attacked by another team. In this case, the calculation coefficient N of the team is reduced to a value less than 1.0. The boost command instructs the team not to expect an attack from another team. The team succeeds in operation if the team is not attacked by another team. In this case, the calculation coefficient N of the team is increased to a value larger than 1.0. The team fails in operation if the team is attacked by another team. In this case, the calculation coefficient N of the team is reduced to a value less than 1.0.

In FIG. 6, a team A issues the intercept command, a team B issues the attack command that instructs the team to attack the team A, a team C issues the boost command, a team D issues the attack command that instructs the team to attack the team C, and a team E issues the attack command that instructs the team to attack the team D. The team A succeeds in operation since the team A has intercepted the team B that has made an attack. In this case, the calculation coefficient $N_B$ of the team B is reduced to a value less than 1.0, and the calculation coefficient $N_A$ of the team A remains unchanged (=1.0) since the team A is not attacked by another team. The team B fails in operation since the team B has been intercepted by the attack target team A. In this case, the calculation coefficient $N_B$ of the team B is reduced to a value less than 1.0. The team C fails in operation since the team C has been attacked by the team D. In this case, the calculation coefficient $N_C$ of the team C is reduced to a value less than 1.0. The team D succeeds in operation since the team D is not intercepted by the attack target team C. In this case, the calculation coefficient $N_C$ of the team C is reduced to a value less than 1.0, and the calculation coefficient $N_D$ of the team D is reduced to a value less than 1.0 since the team D has been attacked by the team E. The team E succeeds in operation since the team E is not intercepted by the attack target team D. In this case, the calculation coefficient $N_D$ of the team D is reduced to a value less than 1.0, and the calculation coefficient $N_E$ of the team E remains unchanged (=1.0) since the team E is not attacked by another team.

Figure 7:
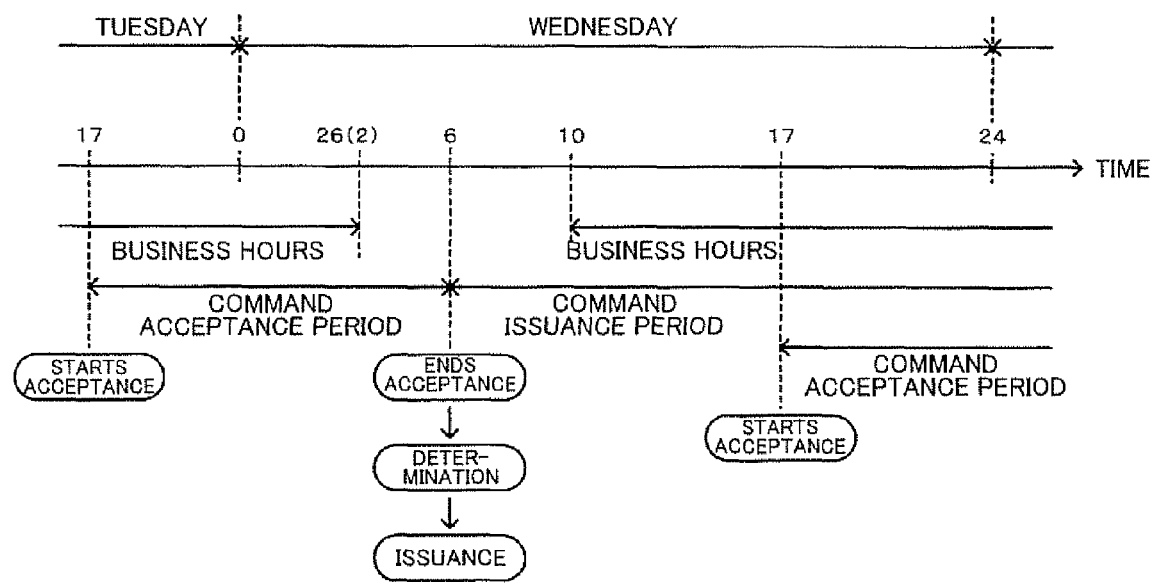
FIG. 7 is a view illustrative of issuance of team command.

The team command is issued in day units. Specifically, the calculation coefficient N is changed in day units. FIG. 7 is a view illustrative of issuance of the team command. As shown in FIG. 7, the team command issued on one day (e.g., Wednesday) is accepted from a given time (e.g., 17:00 pm) on the previous day (e.g., Tuesday), and the acceptance of the team command is closed at a given time (e.g., 6:00 am) before the end of business hours on that day (e.g., Wednesday). The player votes for (selects) the desired team command in a command acceptance period from the acceptance start time to the acceptance finish time. Note that one player can cast one vote. The player votes for the team command using the player terminal 50 possessed by the player. When the command acceptance period has expired, the team command of each team is determined by a majority decision of the players belonging to each team. The determined team command is then issued.

The trial points are obtained by achieving a trial (bonus-point condition) defined in advance. A game play achievement condition such as making a specific action in the game is specified as the trial. The trial is determined by each player. The player determines the trial using the player terminal 50 possessed by the player.

Figure 8A:
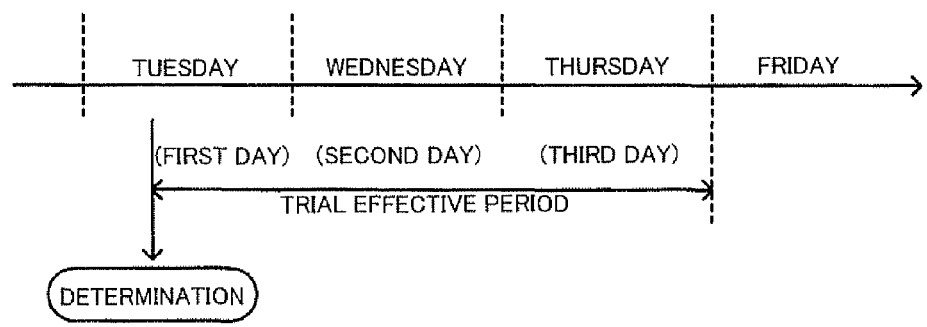
FIG. 8A is a view illustrative of a trial effective period.
Figure 8B:
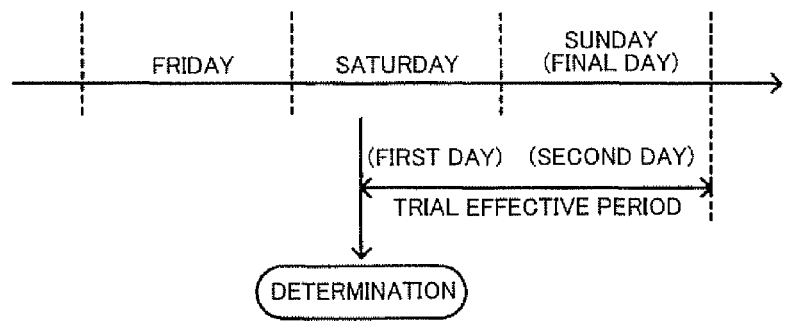
FIG. 8B is a view illustrative of a trial effective period.

An effective period is set for the trial. When the player has succeeded in the trial within the effective period, the player obtains given trial points. FIGS. 8A and 8B are views illustrative of the trial effective period. As shown in FIGS. 8A and 8B, the trial effective period is specified as up to three days including the day when the player determines the trial. As shown in FIG. 8A, when the player determines the trial on Tuesday, the trial effective period is from Tuesday to Thursday, that is, the third day from Tuesday. As shown in FIG. 8B, when the player determines the trial on Saturday, the trial effective period is from Saturday to Sunday, that is, the final day of the league series.

Figure 9:
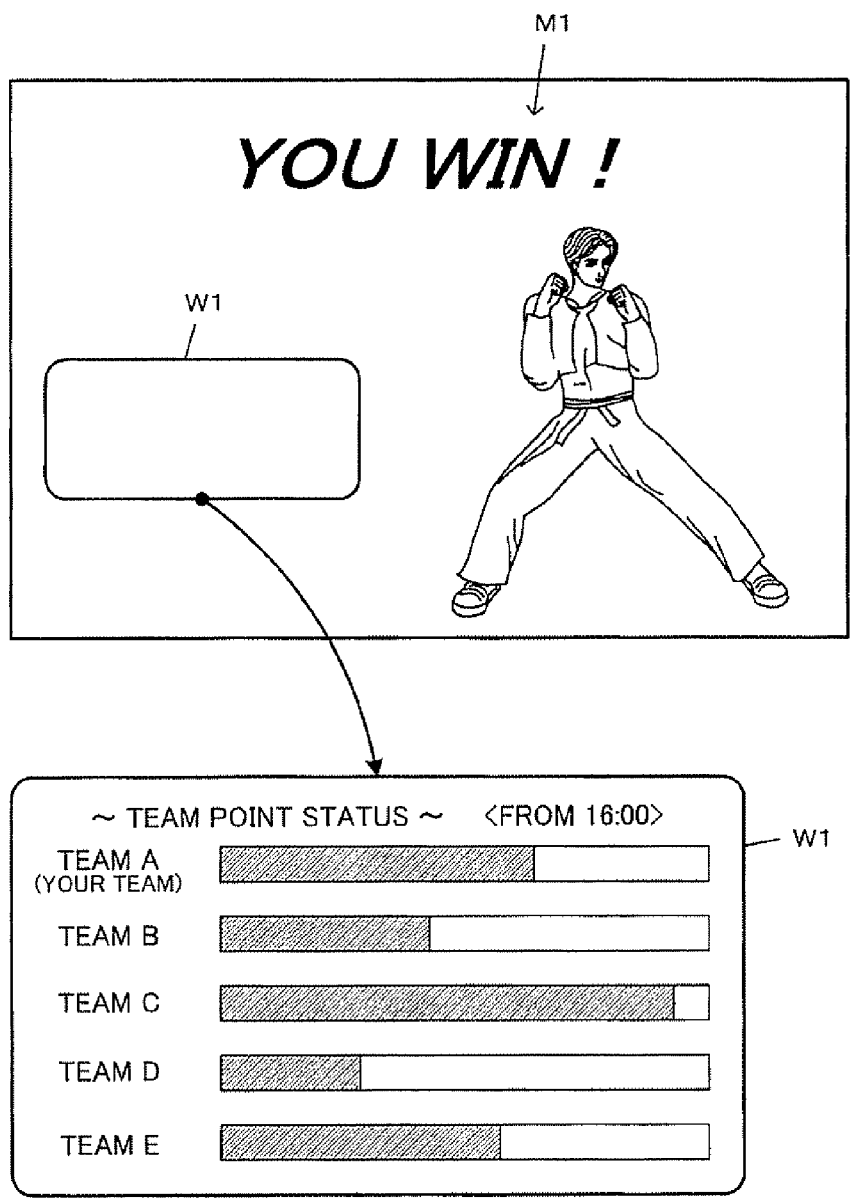
FIG. 9 shows an example of an after-match screen.

The team points obtained by each team are displayed after game play using the game device 10. FIG. 9 is a view showing an example of an after-match screen displayed on the game device 10 after game play. As shown in FIG. 9, a message M1 that indicates the match result and a team point status window W1 are displayed on the after-match screen. The current team point status of each team that belongs to the same league is graphically displayed on the team point status window W1 (see enlarged view). In the graph, the left end is 0 points (lower limit), and the right end is 1000 points (upper limit). The team point status indicates the points obtained in one interval within the league series period.

Figure 10:
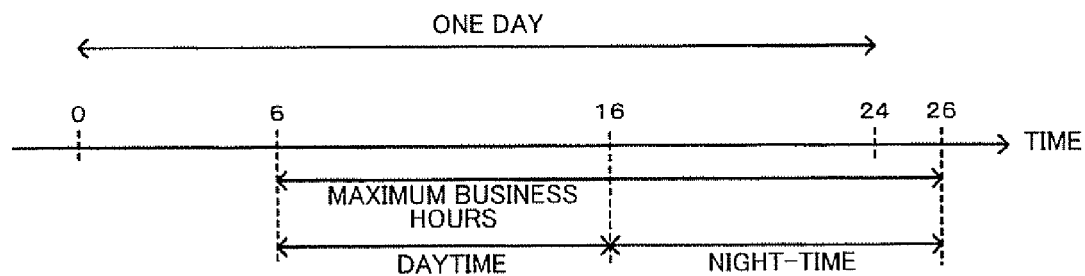
FIG. 10 is a view illustrative of an interval.

FIG. 10 is a view illustrative of the interval. As shown in FIG. 10, the interval refers to a period obtained by equally dividing the maximum business hours on one day in the league series period into the first period (daytime) and the second period (night-time). Specifically, the team point status in the latest interval including the present time is displayed on the team point status window W1 instead of the total team point status from the start of the league series. The display target interval is displayed on the team point status window W1. Therefore, the player can observe interval ranking in the current interval, but cannot observe overall ranking in the league series period.

Display Screen of Player Terminal

The operations performed by the player using the player terminal 50 are described below with reference to a display screen displayed on the player terminal 50. When the player has accessed the server system 30 using the player terminal 50, a player top screen (top page) shown in FIG. 11 is displayed, for example.

Figure 11:
FIG. 11 shows an example of a player top screen.

FIG. 11 is a view showing an example of the player top screen. As shown in FIG. 11, player data such as the player name, player ID, player ranking, play record, and team is displayed on the player top screen. The items that can be selected are underlined. When the player has selected the item "team" on the player top screen, a team top screen is displayed.

Figure 12:
FIG. 12 shows an example of a team top screen.

FIG. 12 is a view showing an example of the team top screen. As shown in FIG. 12, data relating to the team to which the player belongs, such as the team name, team level, players belonging to the team, and team ranking, is displayed on the team top screen. When the player has selected the item "league series" on the team top screen, a league top screen is displayed.

Figure 13:
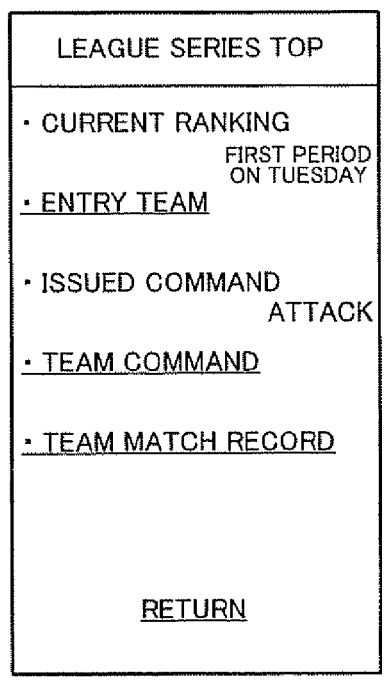
FIG. 13 shows an example of a league top screen.

FIG. 13 is a view showing an example of the league top screen. As shown in FIG. 13, data relating to the league of the team to which the player belongs, such as current interval ranking, entry team, and issued team command, is displayed on the league top screen. When the player has selected the item "team command" on the league top screen, a team command screen is displayed.

Figure 14:
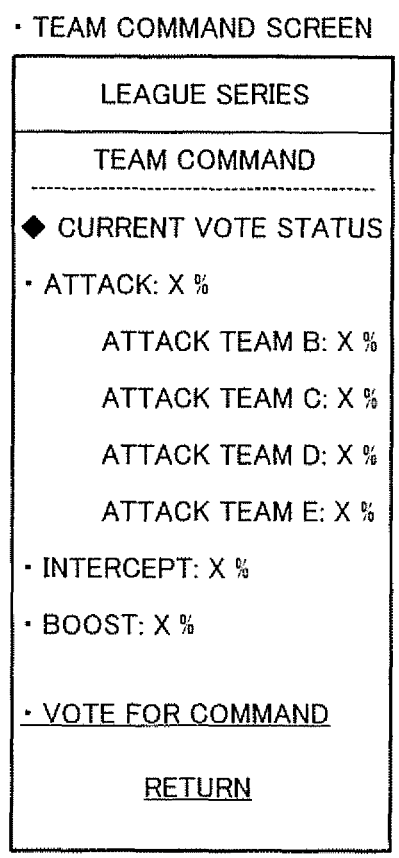
FIG. 14 shows an example of a team command screen.

FIG. 14 is a view showing an example of the team command screen. As shown in FIG. 14, the current vote status of each team command of the team is displayed on the team command screen. When the player has selected the item "command vote" on the team command screen, a command vote screen is displayed.

Figure 15:
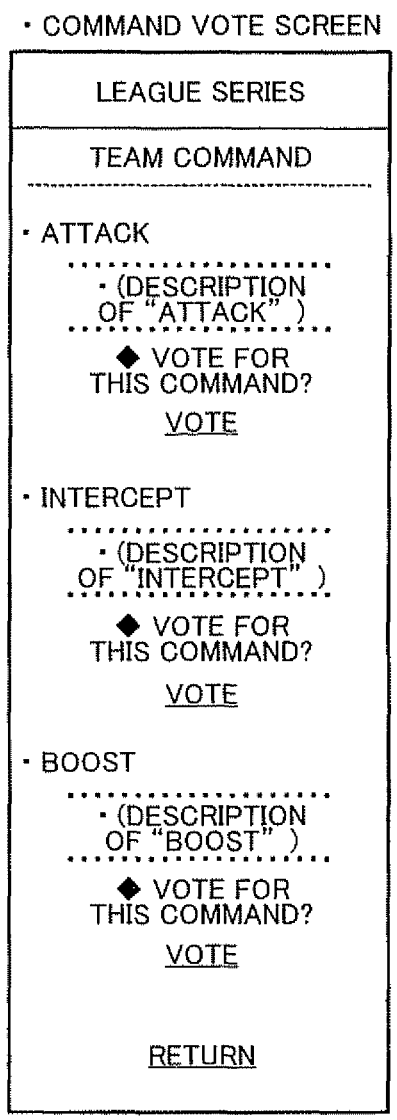
FIG. 15 shows an example of a command vote screen.

FIG. 15 is a view showing an example of the command vote screen. As shown in FIG. 15, a detailed explanation of each team command and a message that asks the player whether or not to vote for each command are displayed on the command vote screen. The player votes for an arbitrary team command by selecting the item "vote" on the team command screen. The team command screen that reflects the vote results is then displayed. In this example, when the player has already voted for one team command, the team command is changed to the team command for which the player has currently voted. Note that the team command may not be changed.

Figure 16:
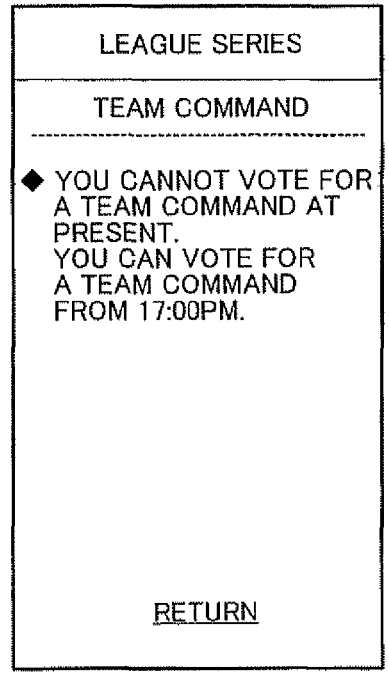
FIG. 16 shows an example of a command vote unavailable screen.

When the player has selected the item "team command" on the league top screen (see FIG. 13) in a period other than the team command acceptance period, a command vote unavailable screen is displayed. FIG. 16 is a view showing an example of the command vote unavailable screen. As shown in FIG. 16, a message that notifies the player that the player cannot vote for the team command outside the command acceptance period is displayed on the command vote unavailable screen.

Figure 17:
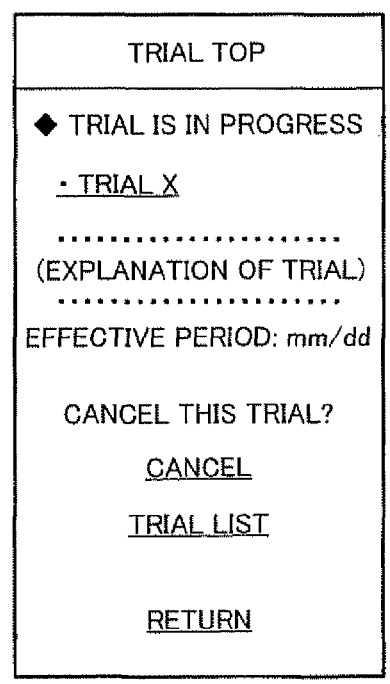
FIG. 17 shows an example of a trial top screen.

When the player has selected the item "trial" on the player top screen (see FIG. 11), a trial top screen is displayed. FIG. 17 is a view showing an example of the trial top screen. As shown in FIG. 17, a detailed explanation and the effective period of the trial and a message that asks the player whether or not to cancel the trial are displayed on the trial top screen. When the player has selected the item "cancel" on the trial top screen, the trial is canceled. After a message that notifies the player that the trial has been canceled has been displayed, a trial top screen shown in FIG. 18 is displayed.

Figure 18:
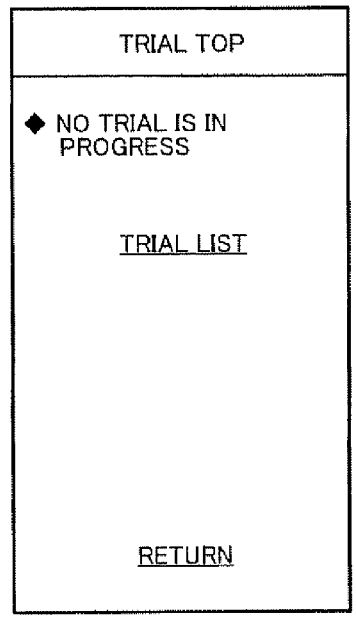
FIG. 18 shows another example of a trial top screen.

FIG. 18 is a view showing another example of the trial top screen. As shown in FIG. 18, a message that notifies the player that no trial is in progress is displayed on the trial top screen. When the player has selected the item "trial" on the player top screen (see FIG. 11) when no trial is in progress, the trial top screen shown in FIG. 18 is displayed.

Figure 19:
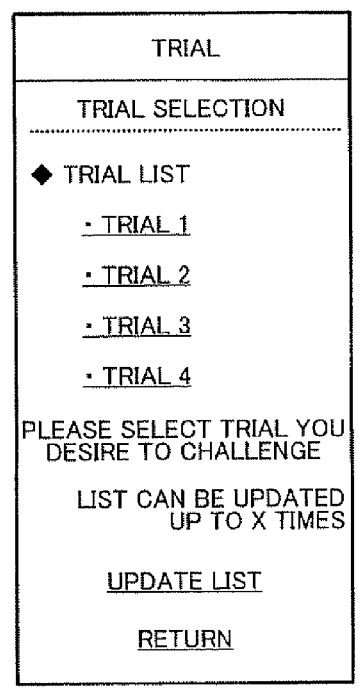
FIG. 19 shows an example of a trial list screen.

When the player has selected the item "trial list" on the trial top screen (see FIGS. 17 and 18), a trial list screen is displayed. FIG. 19 is a view showing an example of the trial list screen. As shown in FIG. 19, a trial list and the number of times that the trial list can be updated are displayed on the trial list screen. When the player has selected the item "list update" on the player list screen, the trial list currently displayed is updated, and a new trial list is displayed. The number of times that the trial list can be updated is decremented by one. Specifically, update of the trial list is limited. For example, the player is allowed to update the trial list three times a day. When the player has selected an arbitrary trial in the trial list, a trial description screen is displayed.

FIG. 20 is a view showing an example of the trial description screen. As shown in FIG. 20, a detailed explanation (achievement condition) of the selected trial and a message that asks the player whether or not to challenge the trial are displayed on the trial description screen. When the player has selected the item "challenge" on the trial description screen, the trial period starts.

When the player has selected an arbitrary trial on the trial list screen when another trial is in progress, a trial description screen shown in FIG. 21 is displayed. FIG. 21 is a view showing another example of the trial description screen. As shown in FIG. 21, a detailed explanation (achievement condition) of the selected trial and a message that asks the player whether or not to cancel the trial in progress and challenge the selected trial are displayed on the trial description screen. When the player has selected the item "challenge" on the trial description screen, the trial in progress is canceled, and the trial period of the selected trial period starts.

Game Server

Figure 22:
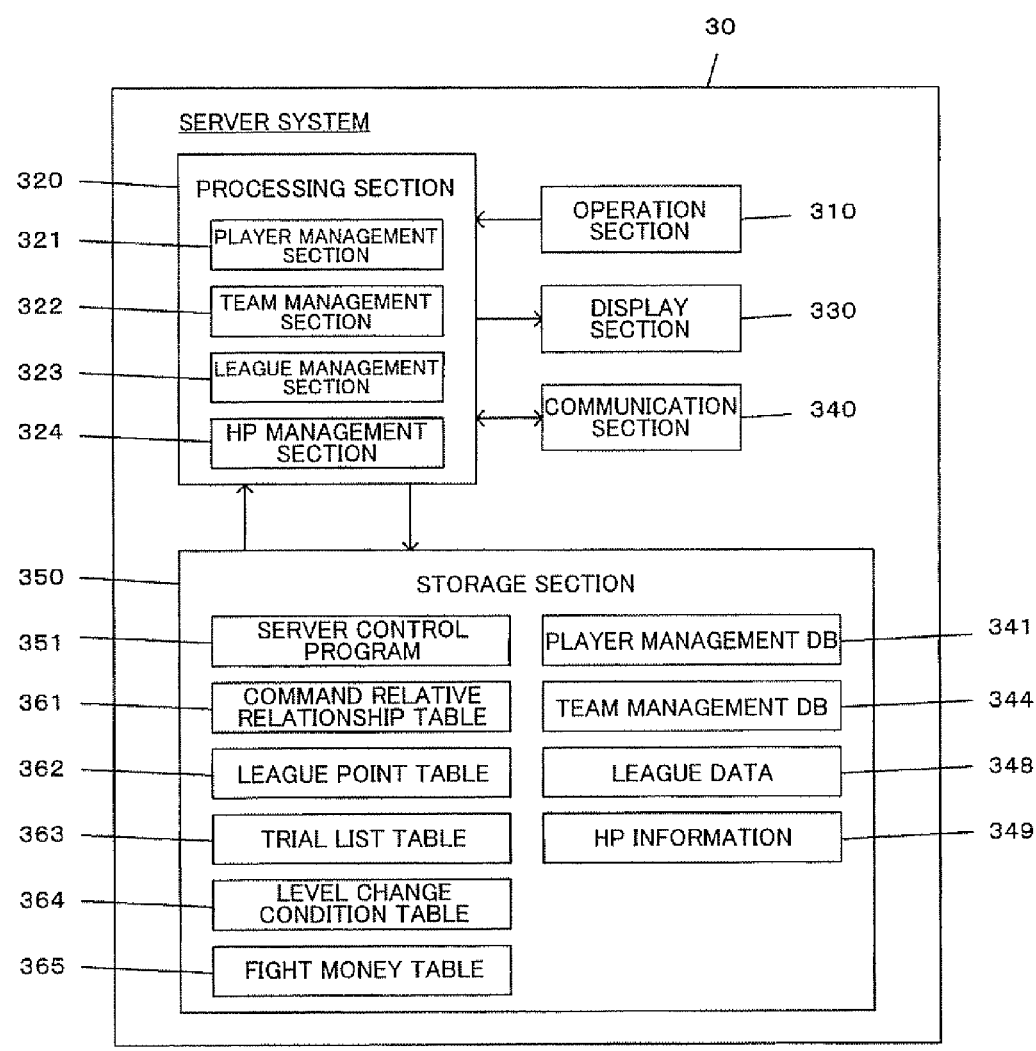
FIG. 22 is a view showing the functional configuration of a server system.

FIG. 22 is a block diagram showing the functional configuration of the server system 30. As shown in FIG. 22, the server system 30 includes an operation section 310, a processing section 320, a display section 330, a communication section 340, and a storage section 350.

The operation section 310 receives operation instructions from the administrator of the server system 30, and outputs an operation signal corresponding to the operation to the processing section 320. The function of the operation input section 310 is implemented by a button switch, a lever, a dial, a mouse, a keyboard, a touch panel, various sensors, and the like.

The processing section 320 controls the entire server system 30 based on a program and data stored in the storage section 350, the operation signal input from the operation section 310, data received from an external device (mainly the game device 10) through the communication section 340, and the like. The function of the processing section 320 is implemented by a calculation device such as a CPU (CISC or RISC) or an ASIC (e.g. gate array) and its control program, for example. In this embodiment, the processing section 320 includes a player management section 321, a team management section 322, a league management section 323, and an HP management section 324.

Figure 23:
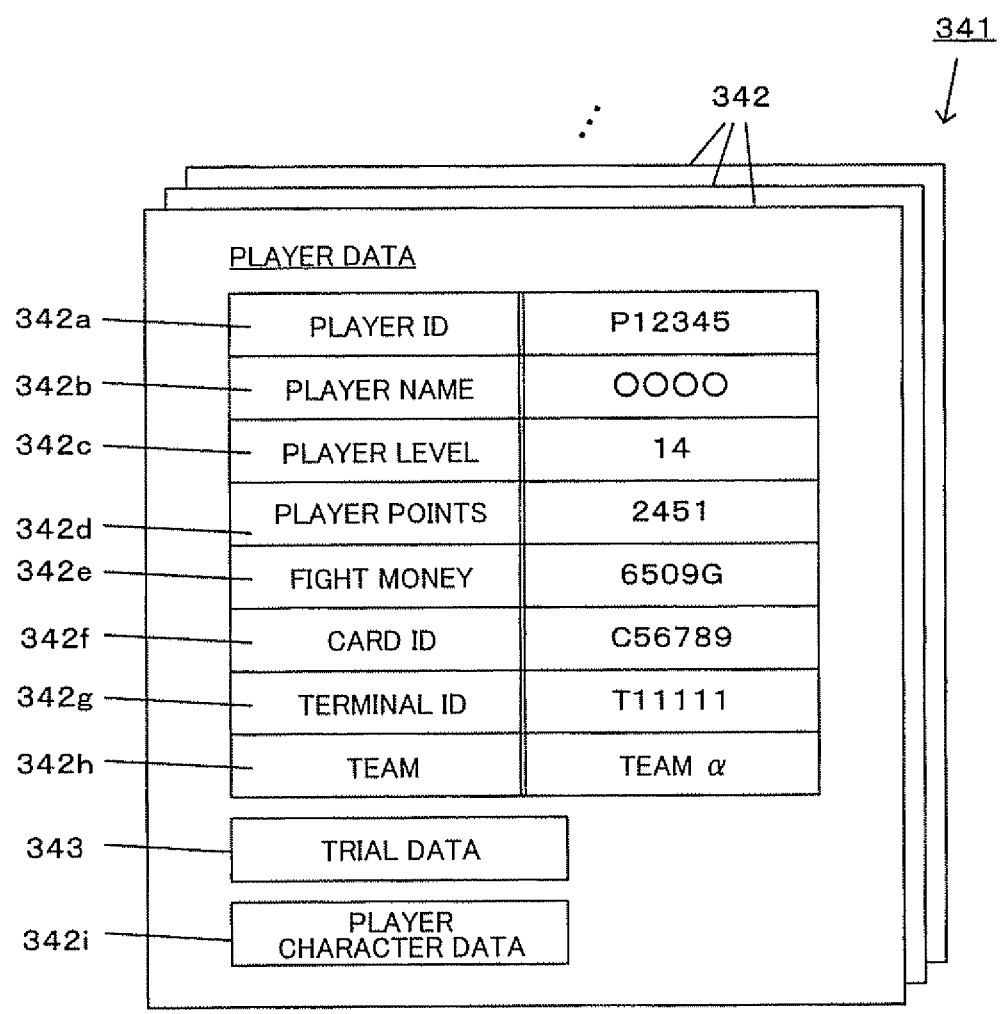
FIG. 23 shows a data configuration example of a player management DB.

The player management section 321 manages the player registered in the game system 1. Data relating to the registered player is stored in a player management DB 341. FIG. 2 shows an example of the player management DB 341. As shown in FIG. 23, the player management DB 341 stores a plurality of pieces of player data 342 relating to a plurality of players. A player ID 342a, a player name 342b, a player level 342c, player points 342d, fight money 342e, a card ID 342f of the game card 20 possessed by the player, a terminal ID 342g of the player terminal 50 possessed by the player, a team 342h to which the player belongs, trial data 343, and player character data 342i are stored as the player data 342.

Figure 24:
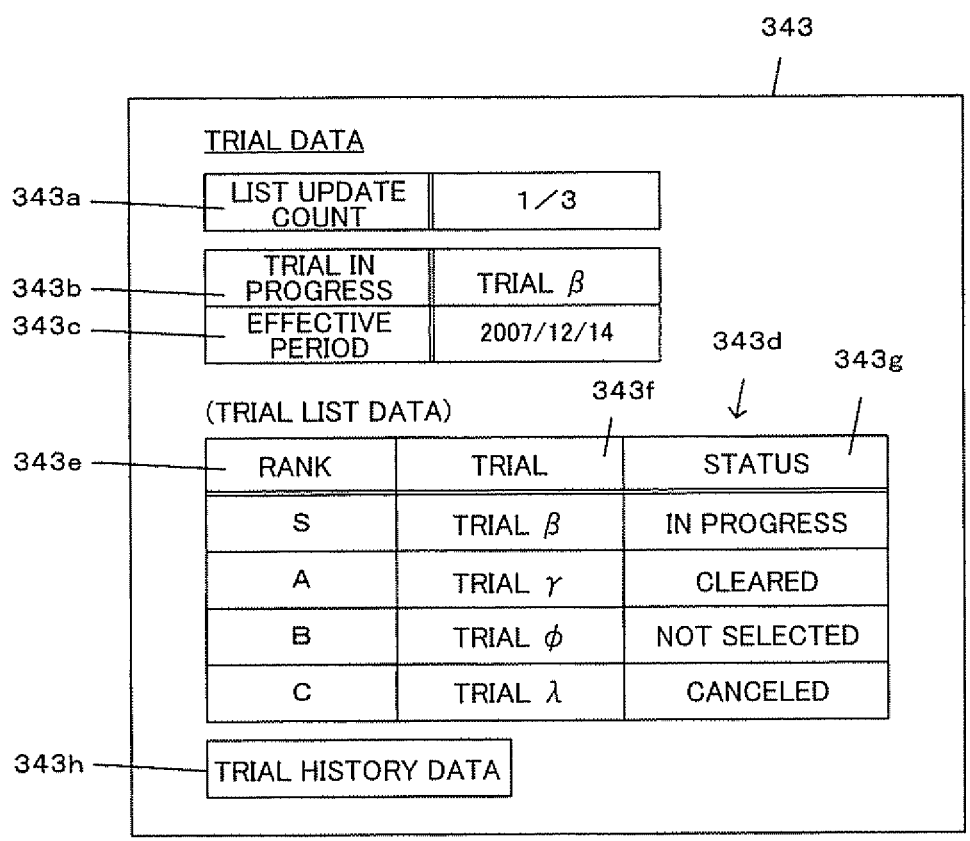
FIG. 24 shows a data configuration example of trial data.

The trial data 343 is data relating to the trial selected by the player. FIG. 24 shows an example of the data configuration of the trial data 343. As shown in FIG. 24, a trial list update count 343a, a trial in progress 343b, an effective period 343c, trial list data 343d, and trial history data 343h are stored as the trial data 343. The list update count 343a indicates the number of times that the trial list has been updated in one day. A rank 343e, a trial 343f, and a status 343g are stored as the trial list data 343d. The status 343g stores a value that indicates whether the corresponding trial is not selected, is in progress, is canceled, or is cleared. The trial history data 343h includes data that indicates the trial list that has been generated and the trial that has been cleared/canceled.

Data relating to all trials provided in advance is stored in a trial list table 363. FIG. 25 shows an example of the data configuration of the trial list table 363. As shown in FIG. 25, a trial ID 363a, a trial name 363b, a clear condition 363c, and a rank 363d are stored in the trial list table 363.

When player-related information is requested from the game device 10, the player management section 321 transmits the player-related information to the game device 10. Specifically, the player management section 321 specifies the player corresponding to the requested player-related information and the team to which the player belongs, and transmits data including 1) the player data 342 corresponding to the specified player, 2) the current calculation coefficient N of the specified team, and 3) the team points of each team in the league in the current interval to the game device 10 as the player-related information.

Figure 26:
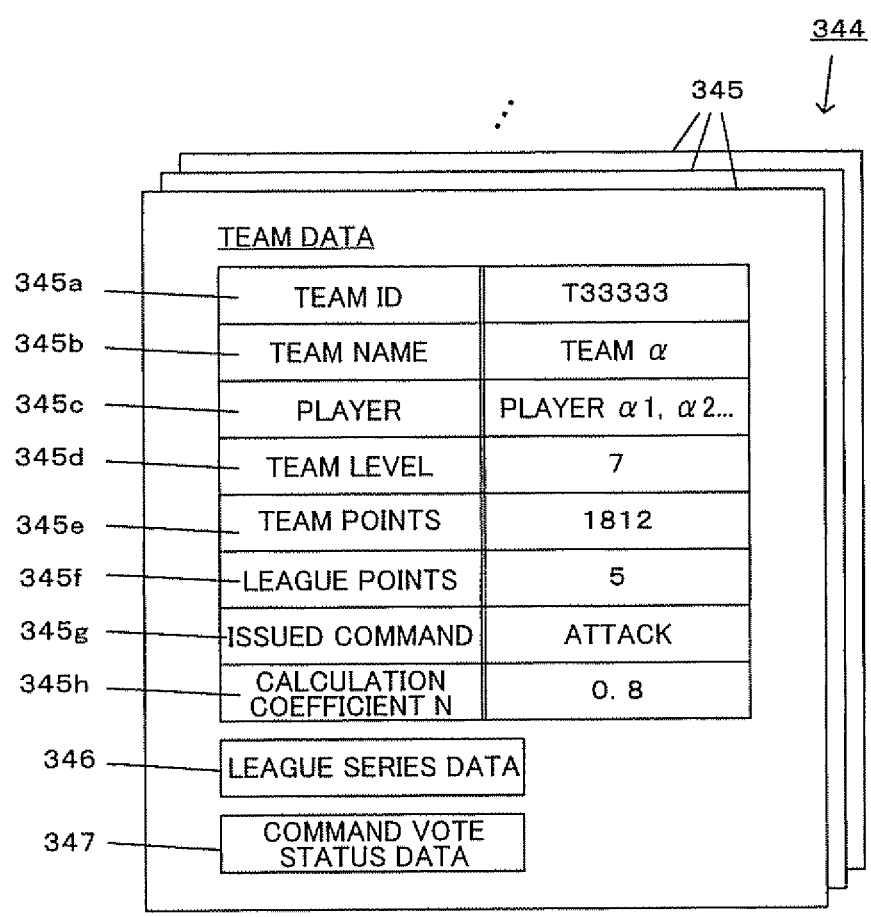
FIG. 26 shows a data configuration example of a team management DB.

Data relating to the team is stored in a team management DB 344. FIG. 26 shows an example of the team management DB 344. As shown in FIG. 26, the team management DB 344 stores a plurality of pieces of team data 345 relating to a plurality of teams. A team ID 345a, a team name 345b, players 345c belonging to the team, a team level 345d, team points 345e, league points 345f, an issued team command 345g, a calculation coefficient 345h, league series data 346, and command vote status data 347 are stored as the team data 345.

The league series data 346 is data relating to the league to which the team belongs. FIG. 27 shows an example of the data configuration of the league series data 346. As shown in FIG. 27, a league ID 346a of the league to which the team belongs, and match record data 346b are stored as the league series data 346. Team points 346d and interval ranking 346e are stored as the match record data 346b corresponding to each interval 346c.

The command vote status data 347 is data relating to the vote status of the team commands by the players belonging to the team. FIG. 28 shows an example of the data configuration of the command vote status data 347. As shown in FIG. 28, a voting player 347b and a total votes cast 347c are stored as the command vote status data 347 corresponding to each team command 347a.

When the player management section 321 has received player notification information transmitted from the game device 10, the player management section 321 updates the corresponding player data 342 and the like. The player notification information according to this embodiment is data transmitted from the game device 10 after the game ends, and includes 1) the player data updated based on the game results and 2) the team points obtained in the game. Specifically, the player management section 321 specifies the player, and updates the player data 342 relating to the specified player based on the received player data. When the player belongs to a team, the player management section 321 adds the received team points to the team points of the team to which the player belongs.

The team management section 322 manages each team. Specifically, the team management section 322 updates the team level of each team at a given time (e.g., 4:00 am before business hours) specified in advance. Specifically, the team management section 322 changes the team level of each team having a team level equal to or lower than "4" corresponding to the team points referring to a level change condition table 364.

The level change condition table 364 is a data table that defines a team level change condition. FIG. 29 shows an example of the data configuration of the level change condition table 364. As shown in FIG. 29, a team level 364a and a change condition 364b are stored in the level change condition table 364. The change condition 364b is defined as a team point range when the team level is "1", to "5", and is defined as a league point range when the team level is "5" to "10". The team point range corresponding to the team level "5" is defined as the lower limit ("1000" in FIG. 29). The change condition corresponding to a team level equal to or higher than "5" is based on the league points.

The team management section 322 determines the team command issued by each team at a given time (e.g., 6:00 am before business hours) specified in advance. Specifically, the team management section 322 determines the team command which has been polled the largest number of votes to be the team command issued by each team referring to the command vote status data 347 stored as the team data 345. The team management section 322 then determines the calculation coefficient N of each team referring to a command relative relationship table 361 based on the determined team command of each team.

The command relative relationship table 361 is a data table that defines the success/failure relative relationship between the team commands. FIG. 30 shows an example of the data configuration of the command relative relationship table 361. As shown in FIG. 30, a success/failure condition 361$b$, success/failure 361$c$, a calculation coefficient N change target team 361$d$, and a calculation coefficient 361$e$ are stored in the command relative relationship table 361 corresponding to each team command 361$a$.

The league management section 323 manages each league. Specifically, the league management section 323 forms a league employed in the league series held on the next day before the league series period (e.g., 4:00 am (before business hours) on the day before the league series starts). Specifically, the league management section 323 forms a league by matching teams having an identical team level equal to or higher than "5".

Data relating to the league formed by the league management section 323 is stored as league data 348. FIG. 31 shows an example of the data configuration of the league data 348. As shown in FIG. 31, a league ID 348$a$, a participating team 348$b$, and a team level 348$c$ are stored as the league data 348 corresponding to each league.

The league management section 323 determines the final ranking of each league after the league series period has ended (e.g., 4:00 am (before business hours) on the final day of the league series). Specifically, the league management section 323 ranks each team that belongs to each league based on the team points. The league management section 323 then changes the league points of each team corresponding to the determined league ranking referring to a league point table 362.

The league point table 362 is a data table that defines the amount of change in league points corresponding to league ranking. FIG. 32 shows an example of the data configuration of the league point table 362. As shown in FIG. 32, a league ranking 362$a$ and a league point change amount 362$b$ are stored in the league point table 362.

The league management section 323 changes the team level of each team corresponding to the changed league points referring to the level change condition table 364.

The league management section 323 awards fight money corresponding to league ranking to the player who belongs to each team referring to a fight money table 365. The fight money table 365 is a data table that defines fight money obtained corresponding to league ranking. FIG. 33 shows an example of the data configuration of the fight money table 365. As shown in FIG. 33, league ranking 365$a$, a team level 365$b$, and fight money 365$c$ are stored in the fight money table 365.

The HP management section 324 causes the server system 30 to function as a Web server, and maintains/manages a service site based on HP information 349 through the Internet. The HP information 349 is information relating to the service site maintained by the server system 30 through the Internet. Specifically, the HP information 349 includes data relating to a page (homepage: HP) written in HTML, a CGI program, and the like.

When the HP management section 324 has received a service site access request from the player terminal 50, the HP management section 324 specifies the player terminal 50 and the player from the terminal ID received together with the request, and performs a login process. The HP management section 324 generates screen data for displaying a display screen (see FIGS. 11 to 21) corresponding to the player in response to the request from the player terminal 50 referring to the player data 342 relating to the specified player and the team data 345 relating to the team to which the specified player belongs, and transmits the screen data to the player terminal 50.

The HP management section 324 updates the player data 342 and the team data 345 in response to the request from the player terminal 50. Specifically, the HP management section 324 generates a new trial list in response to a trial list update request that is transmitted from the player terminal 50 when the player has selected the item "list update" on the trial list screen (see FIG. 19), for example. The new trial list includes trials other than the trials included in the previous trial list of the player.

The HP management section 324 starts the trial period of the requested trial in response to a trial challenge request that is transmitted from the player terminal 50 when the player has selected the item "challenge" on the trial description screen (see FIGS. 20 and 21), for example. When no trial is in progress, the HP management section 324 sets the effective period for the requested trial, and starts the trial period. When a trial is in progress, the HP management section 324 cancels the trial in progress, sets the effective period for the requested trial, and starts the trial period.

The HP management section 324 cancels the trial in progress in response to a trial cancellation request that is transmitted from the player terminal 50 when the player has selected the item "cancel" on the trial top screen (see FIG. 17), for example.

The HP management section 324 receives a team command vote in response to a team command vote request that is transmitted from the player terminal 50 when the player has selected the item "command vote" on the command vote screen (see FIG. 15), for example. Specifically, the HP management section 324 adds the player to the list of players (voting players) which have voted for the requested team command.

When the HP management section 324 has received a logout request from the player terminal 50, the HP management section 324 performs a logout process.

The display section 330 displays a display screen based on an image signal from the processing section 320. The function of the display section 330 is implemented by hardware such as a CRT, an LCD, an ELD, or a PDP.

The communication section 340 connects to the communication line N according to a control signal from the processing section 320, and performs data communication with an external device (mainly the game device 10). The function of the communication section 340 is implemented by a wireless communication module, a jack for a communication cable, a control circuit, or the like.

The storage section 350 stores a system program that implements a function that causes the processing section 320 to control the server system 30, a program and data necessary for implementing various functions according to this embodiment, and the like. The storage section 350 is used as a work area for the processing section 320, and temporarily stores the results of calculations performed by the processing section 320 according to various programs, data input from the operation section 310, and the like. The function of the storage section 350 is implemented by an IC memory, a hard disk, a CD-ROM, a DVD, an MO, a RAM, a VRAM, or the like. In this embodiment, the storage section 350 stores a server control program 351, the command relative relationship table 361, the league point table 362, the trial list table 363, the level change condition table 364, the fight money table 365, the player management DB 341, the team management DB 344, the league data 348, and the HP information 349.

Game Device

Figure 34:
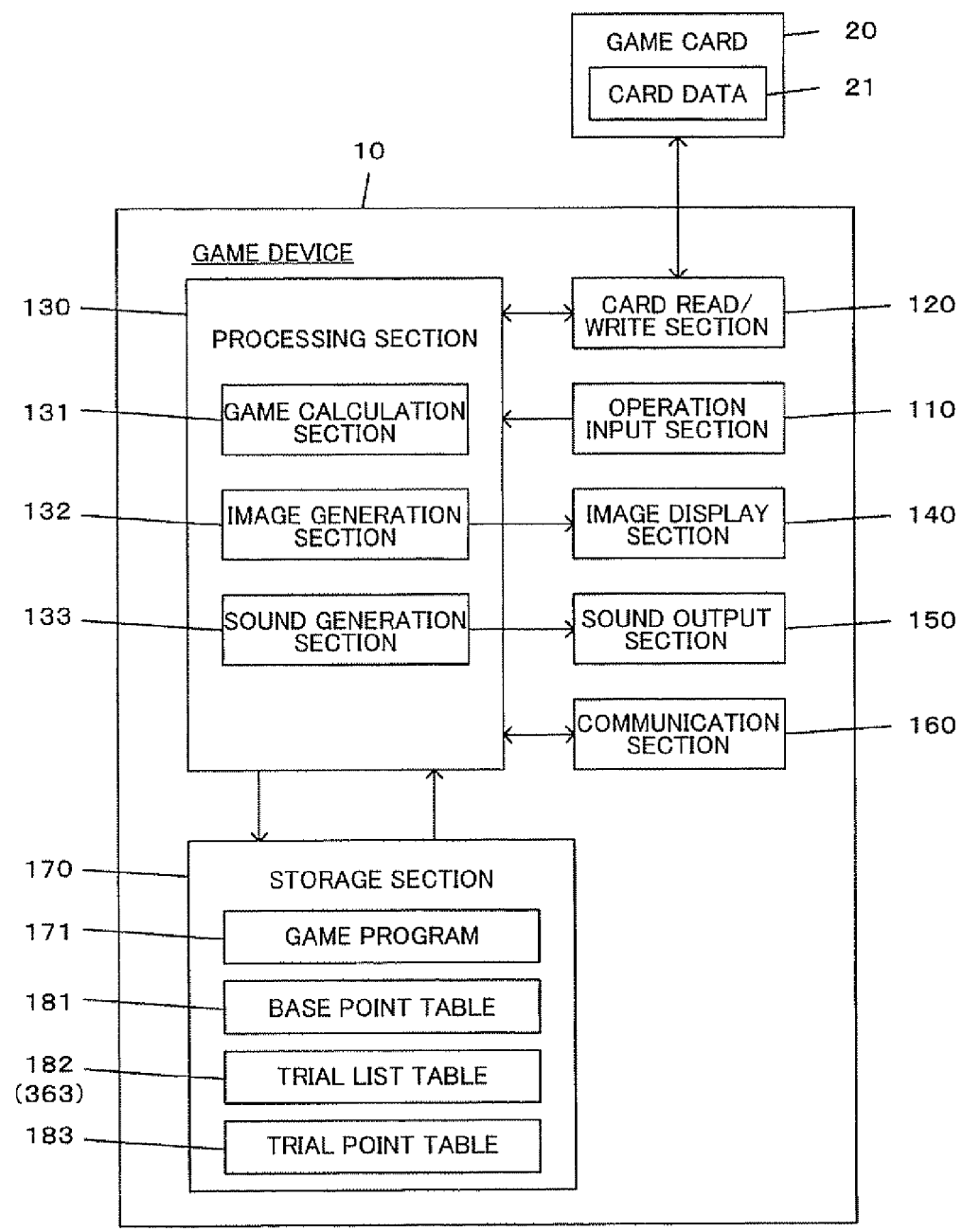
FIG. 34 is a view showing the functional configuration of a game device.

FIG. 34 is a block diagram showing the functional configuration of the game device 10. As shown in FIG. 34, the game device 10 includes an operation input section 110, a card read/write section 120, a processing section 130, an image display section 140, a sound output section 150, a communication section 160, and a storage section 170.

The operation input section 110 receives an operation instruction input from the player, and outputs an operation signal corresponding to the operation to the processing section 130. The function of the operation input section 110 is implemented by a button switch, a lever, a dial, a mouse, a keyboard, various sensors, and the like.

The card read/write section 120 reads card data 21 recorded in the game card 20 inserted into the game device 10, and outputs the card data 21 to the processing section 130. The card read/write section 120 writes data in the game card 20 inserted into the game device 10 according to instructions from the processing section 130 to update the card data 21 recorded in the game card 20.

Figure 35:
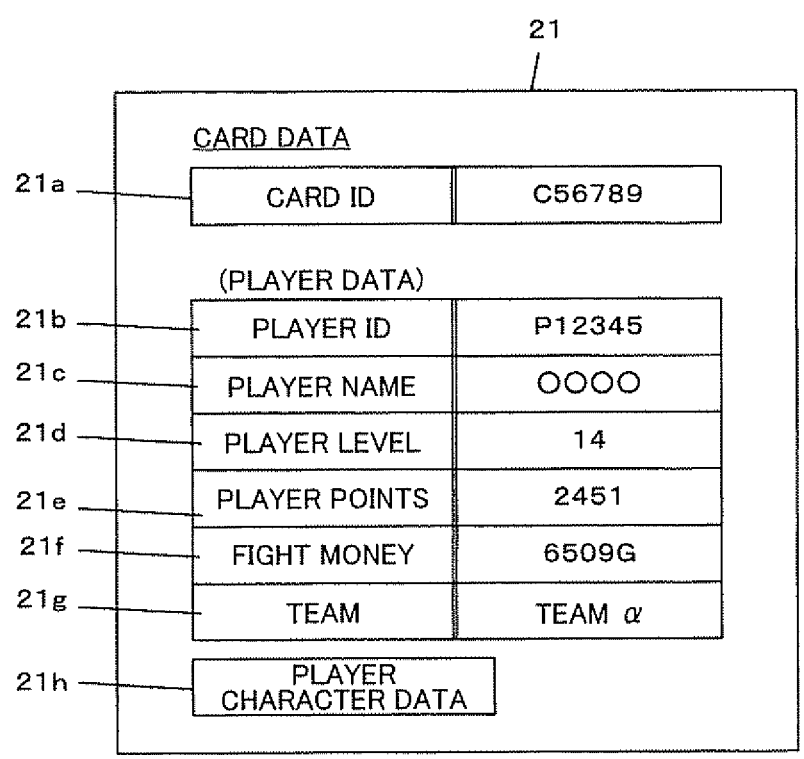
FIG. 35 shows a data configuration example of card data.

FIG. 35 shows an example of the data configuration of the card data 21 recorded in the game card 20. As shown in FIG. 35, a card ID 21a of the game card 20, a player ID 21b, a player name 21c, a player level 21d, player points 21e, fight money 21f, a team 21g, and player character data 21h of the player which possesses the game card 20 are stored as the card data 21.

The processing section 130 controls the entire game device 10, and executes various calculations for proceeding with the game and generating an image, for example. The function of the processing section 130 is implemented by a calculation device such as a CPU (CISC or RISC) or an ASIC (e.g. gate array) and its control program, for example. The processing section 130 includes a game calculation section 131 that mainly executes game calculations, an image generation section 132 that generates an image of a virtual three-dimensional space (game space) viewed from a given viewpoint such as a virtual camera based on various types of data calculated by the game calculation section 131, and a sound generation section 133 that generates game sound such as effect sound and background music (BGM).

The game calculation section 131 executes various game processes based on the operation signal input from the operation input section 100, a program and data read from the storage section 170, and the like. The game processes include setting a game space by disposing various objects in the virtual three-dimensional space, controlling a player character based on the operation signal from the operation input section 110, determining a hit between objects (hit check), controlling the viewpoint (virtual camera), and the like.

The game calculation section 131 executes a game process according to a game program 171. Specifically, the game calculation section 131 reads the card data 21 from the game card 20 inserted into the housing, and specifies the player based on the card data 21. The game calculation section 131 then requests the server system 30 to transmit player-related data relating to the specified player, and receives the player-related data transmitted from the server system 30 in response to the request. The game calculation section 131 selects the CPU match or the player match according to an operation instruction input by the player using the operation input section 110, and determines the opponent player. The game calculation section 131 then starts a match process between the player and the determined opponent player.

After completion of the match process, the game calculation section 131 calculates the player points and fight money awarded to the player based on the match result. The game calculation section 131 calculates the player points and fight money using a known method.

The game calculation section 131 calculates the team points obtained by the player based on the match result. Specifically, the game calculation section 131 calculates the base points referring to a base point table 181. The base point table 181 is a data table that defines the base points obtained as a result of a match.

FIG. 36 shows an example of the data configuration of the base point table 181. As shown in FIG. 36, the base point table 181 includes a match point table 181a, a win point table 181d, and a bonus point table 181g. A match type 181b and match points 181c are stored in the match point table 181a. A relative level difference 181e between the player and the opponent player and win points 181f are stored in the win point table 181d. The relative level difference 181e is a value obtained by subtracting the player level of the player from the player level of the opponent player when the player match is selected. The relative level difference 181e is set at zero when CPU match is selected. A win condition 181h and bonus points 181i are stored as the bonus point table 181g.

The match points are obtained as a result of a match. The win points and the bonus points are obtained by winning a match. The win points and the bonus points are zero when the player has lost a match. Therefore, when the player has lost a match, the game calculation section 131 calculates the match points based on the match point table 181a as the base points. When the player has won a match, the game calculation section 131 calculates the sum of the match points based on the match point table 181a and the bonus points based on the bonus point table 181g as the base points.

The game calculation section 131 determines the presence or absence of a trial in progress of the player. When a trial in progress exists, the game calculation section 131 determines whether or not the trial has been cleared. The trial data is stored in a trial list table 182. The trial list table 182 is a data table that contains the same data as that of the trial list table 363 of the server system 30. When the game calculation section 131 has determined that the trial has been cleared, the game calculation section 131 determines the trial points referring to a trial point table 183.

The trial point table 183 is a data table that defines the trial points obtained by clearing a trial. FIG. 37 shows an example of the data configuration of the trial point table 183. As shown in FIG. 37, a trial rank 183a and trial points 183b are stored in the trial point table 183.

The game calculation section 131 multiplies the calculated base points by the calculation coefficient N, adds the trial points to the resulting value, and determines the resulting value as the team points of the player.

The game calculation section 131 updates the received player data based on the match result. The game calculation section 131 transmits the updated player data and the calculated team points to the server system 30 as the player notification information.

The game calculation section 131 causes the image display section 140 to display the after-match screen (see FIG. 9) that shows the team point status of each team that belongs to an identical league based on the interval team points of each team included in the received player-related information. In this case, a value obtained by adding the calculated team points to the interval team points is displayed as the team points of the team to which the player belongs. The game calculation section 131 then updates the card data 21 recorded in the game card 20 based on the calculated player points, fight money, a determination result as to whether or not the trial has been cleared, and the like, and causes the game card 20 to be discharged from the housing.

The image generation section 132 generates a game image (3D CG image) for displaying a game screen based on the calculation results of the game calculation section 131, and outputs an image signal of the generated image to the image display section 140. The image display section 140 displays the game screen based on the image signal from the image generation section 132 while redrawing the screen of one frame every 1/60th of a second, for example. The function of the image display section 140 is implemented by hardware such as a CRT, an LCD, an ELD, a PDP, or an HMD.

The sound generation section 133 generates game sound such as effect sound and BGM used during the game, and outputs a sound signal of the generated game sound to the sound output section 150. The sound output section 150 outputs the game sound such as effect sound and BGM based on the sound signal from the sound generation section 133. The function of the sound output section 150 is implemented by a speaker or the like.

The storage section 170 stores a system program that implements a function that causes the processing section 130 to control the game device 10, a program and data necessary for causing the processing section 130 to execute the game, and the like. The storage section 170 is used as a work area for the processing section 130, and temporarily stores the results of calculations performed by the processing section 130 according to various programs, data input from the operation input section 110, and the like. The function of the storage section 170 is implemented by an IC memory, a hard disk, a CD-ROM, a DVD, an MO, a RAM, a VRAM, or the like. The storage section 170 also stores the game program 171 that causes the processing section 130 to function as the game calculation section 131, and game data. The game data includes the base point table 181, the trial list table 182, and the trial point table 183.

Process Flow (A) Server System 30

Figure 38:
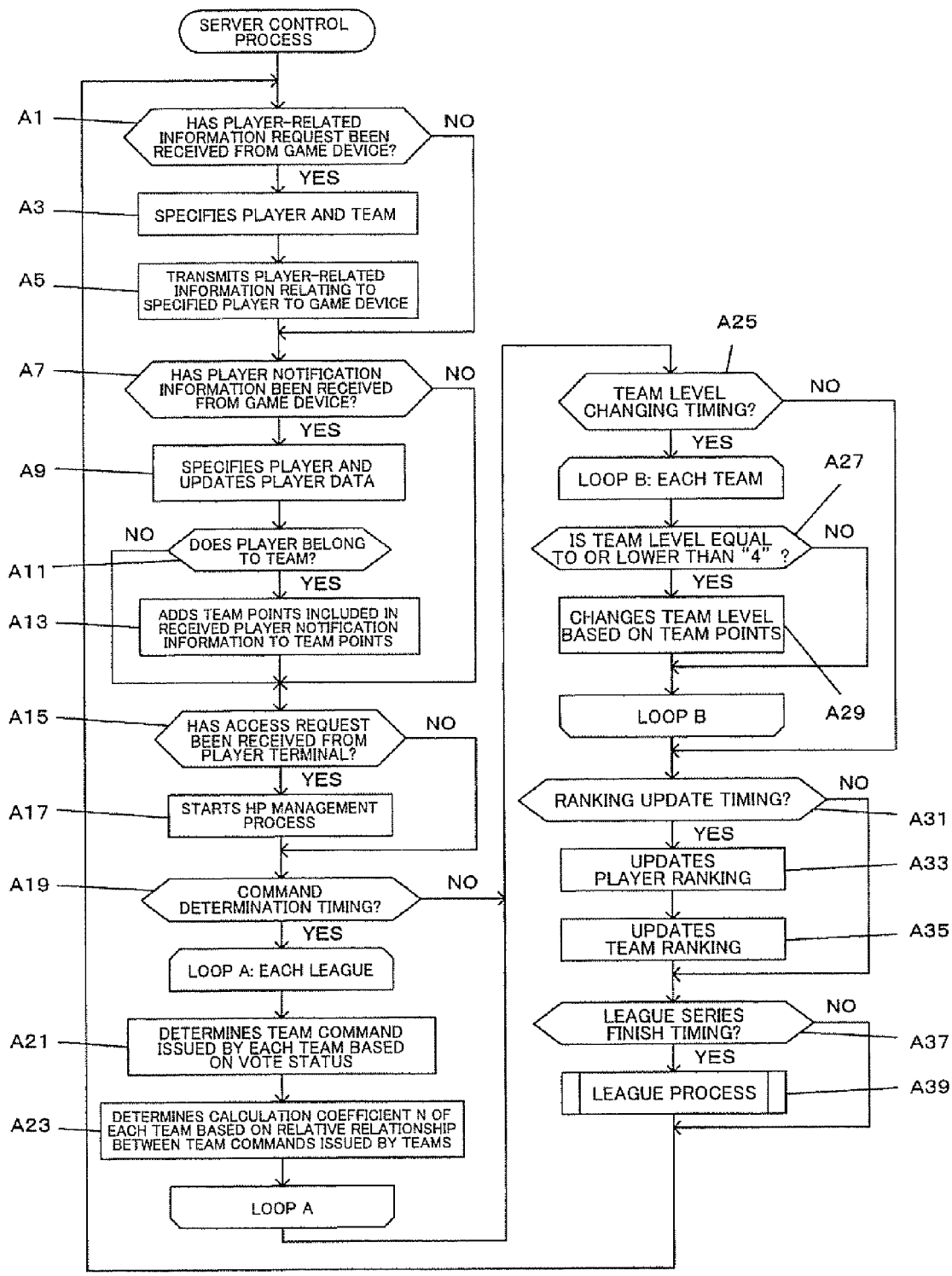
FIG. 38 is a flowchart showing a server control process.

FIG. 38 is a flowchart illustrative of a server control process executed in the server system 30. This process is implemented by causing the processing section 320 to execute the server control program 351. As shown in FIG. 38, when the server system 30 has received a player-related information request from the game device 10 (step A1: YES), the player management section 321 specifies the player corresponding to the player-related information and the team to which the player belongs (step A3). The player management section 321 generates player-related information including the player data 342 corresponding to the specified player, the calculation coefficient N of the specified team, and the interval team points of each team that belongs to the same league, and transmits the player-related information to the game device 10 (step A5).

When the server system 30 has received the player notification information from the game device 10 (step A7: YES), the player management section 321 specifies the player corresponding to the player notification information, and updates the player data 342 relating to the specified player based on the player data included in the received player notification information (step A9). When the specified player belongs to a team (step A11: YES), the player management section 321 adds the team points included in the received player notification information to the team points of the team (step A13).

When the server system 30 has received an access request from the player terminal 50 (step A15: YES), the HP management section 324 starts an HP management process on the player terminal 50 (step A17). The HP management process is described later.

When a command determination timing specified in advance has been reached (step A19: YES), a loop A process is performed on each league. In the loop A, the team management section 322 determines the team command which has been polled the largest number of votes to be the team command issued by each team corresponding to each team that belongs to the target league (step A21). The team management section 322 then determines the calculation coefficient N of each team based on the relative relationship between the team commands issued by the teams that belong to the target league (step A23). The loop A is thus performed.

When a team level change timing specified in advance has been reached (step A25: YES), a loop B process is performed on each team. In the loop B, when the team level of the target team is equal to or lower than "4" (step A11: YES), the team management section 322 changes the team level of the target team based on the current team points of the target team according to the level change condition table 364 (step A29). The loop B is thus performed.

When a ranking update timing specified in advance has been reached (step A31: YES), the player management section 321 ranks each player based on the current player points of each player, and updates player ranking (step A33). The team management section 322 ranks each team based on the current team points of each team, and updates team ranking (step A35).

When a league series finish timing specified in advance has been reached (step A37: YES), a league process is performed (step A39).

Figure 39:
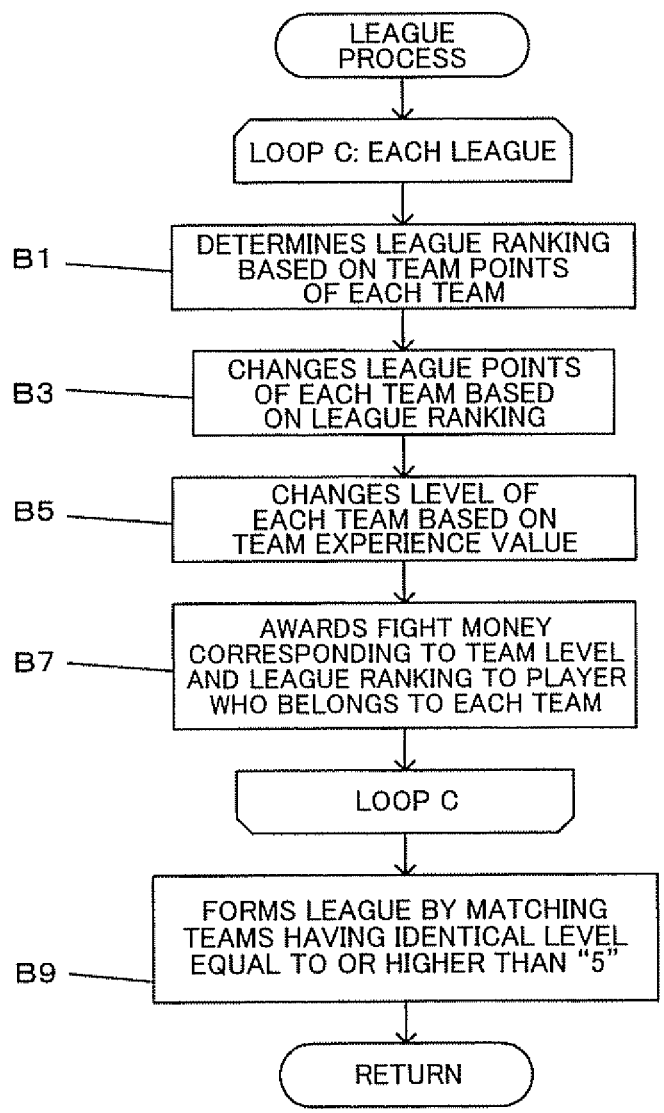
FIG. 39 is a flowchart showing a league process executed during a server control process.

FIG. 39 is a view illustrative of the league process. As shown in FIG. 39, a loop C process is performed on each league. In the loop C, the league management section 323 determines league ranking based on the team points of each team that belongs to the target league (step B1). The league management section 323 then changes the league points of each team that belongs to the target league corresponding to league ranking (step B3). The league management section 323 changes the team level of each team corresponding to the league points changed by the league management section 323 (step B5). The league management section 323 awards fight money corresponding to the team level of the team and league ranking to the player who belongs to each team (step B7). The loop C is thus performed.

When the loop C process has been performed on all of the leagues, the league management section 323 forms a league by matching teams having an identical level equal to or higher than "5" (step B9). The league management section 323 thus completes the league process.

After completion of the league process, the process from the step A1 is repeated.

Figure 40:
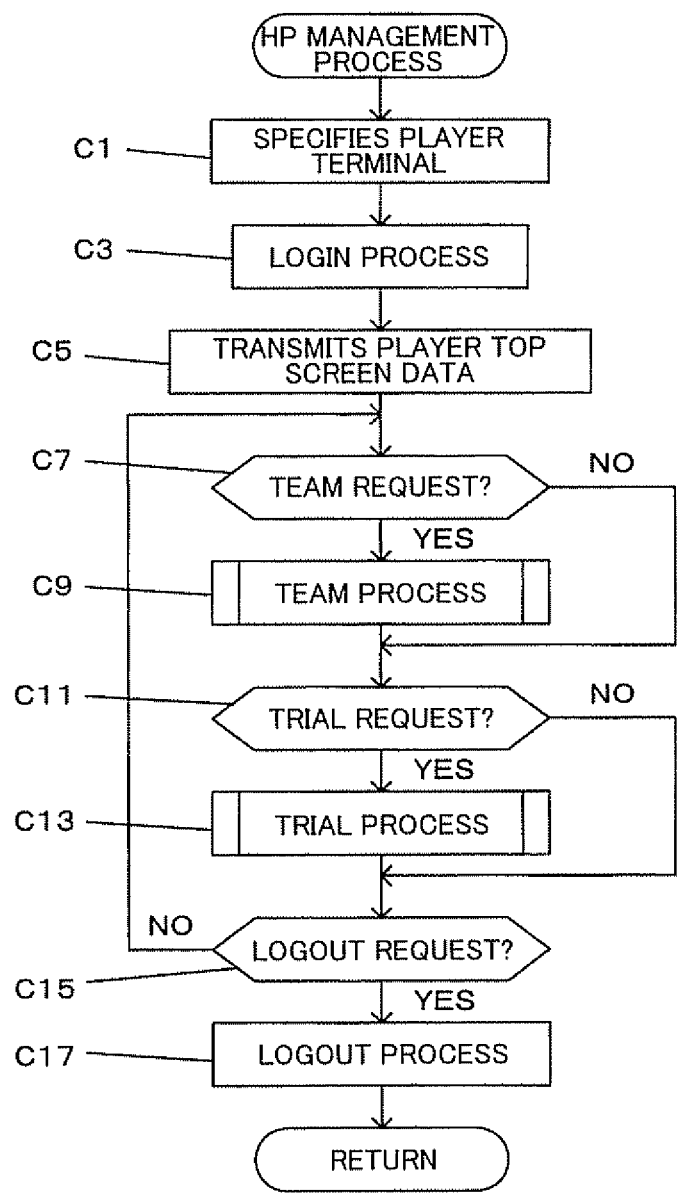
FIG. 40 is a flowchart showing an HP management process executed during a server control process.

FIG. 40 is a view illustrative of the HP management process. As shown in FIG. 40, the HP management section 324 specifies the player who possesses the player terminal 50 that has transmitted the access request, and performs the login process that authenticates the specified player (step C3). The HP management section 324 then generates the screen data for displaying the player top screen (see FIG. 11) for the player based on the player data 342 relating to the specified player, and transmits the screen data to the player terminal 50 (step C5).

When the server system 30 has received a team request from the player terminal 50 (step C7: YES), a team process is performed (step C9). The team request is transmitted from the player terminal 50 when the player has selected the item "team" on the player top screen (see FIG. 11), for example.

Figure 41:
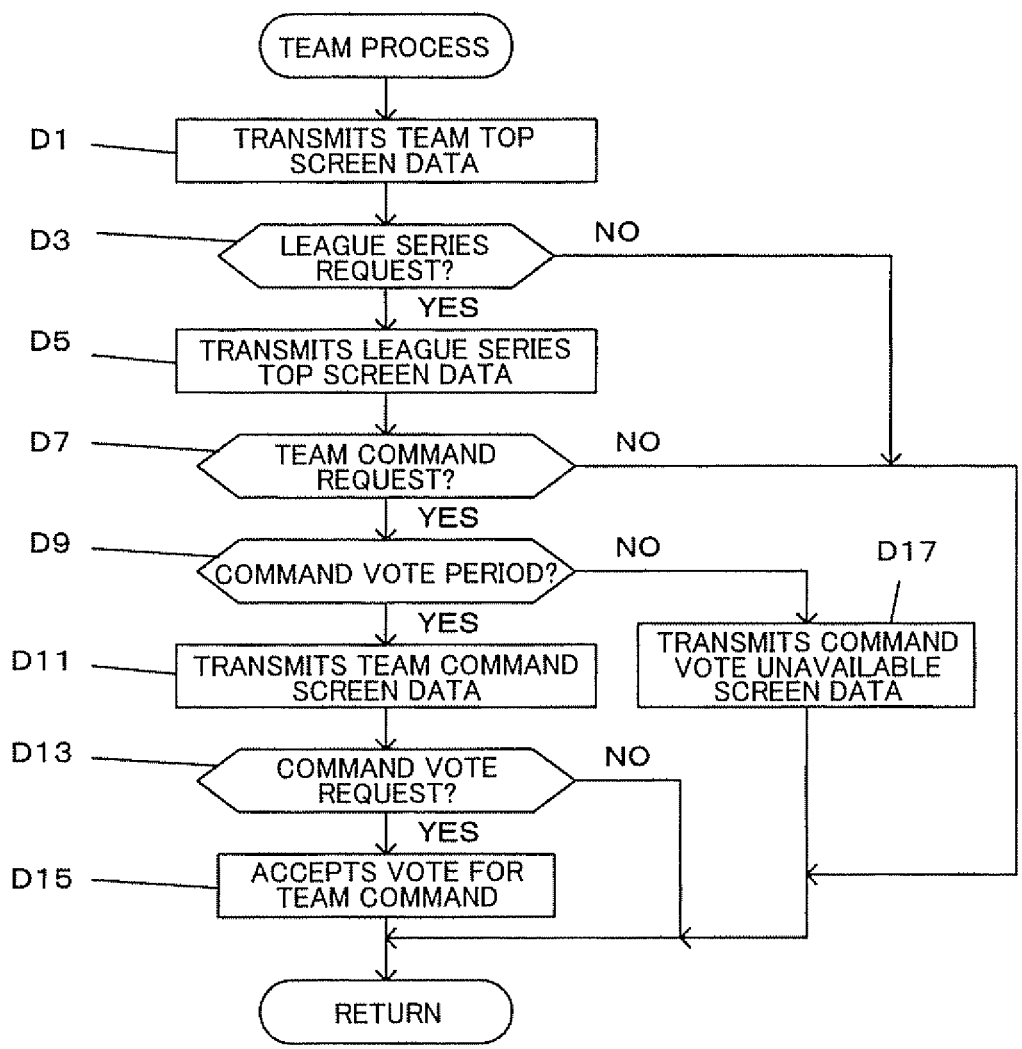
FIG. 41 is a flowchart showing a team process executed during an HP management process.

FIG. 41 is a view illustrative of the team process. As shown in FIG. 41, the HP management section 324 generates the screen data for displaying the team top screen (see FIG. 12) for the player based on the team data 345 relating to the team to which the player belongs, and transmits the screen data to the player terminal 50 (step D1).

When the server system 30 has received a league series request from the player terminal 50 (step D3: YES), the HP management section 324 generates the screen data for displaying the league top screen (see FIG. 13), and transmits the screen data to the player terminal 50 (step D5). The league series request is transmitted from the player terminal 50 when the player has selected the item "league series" on the team top screen, for example.

When the server system 30 has received a team command request from the player terminal 50 (step D7: YES), whether or not the current time is within the command vote period is determined. When the current time is within the command vote period (step D9: YES), the HP management section 324 generates the screen data for displaying the team command screen (see FIG. 14), and transmits the screen data to the player terminal 50 (step D11). When the server system 30 has received a team command vote request from the player terminal 50 (step D13: YES), a vote for the team command is accepted (step D15). When the current time is not within the command vote period (step D9: NO), the HP management section 324 generates the screen data for displaying the command vote unavailable screen (see FIG. 16), and transmits the screen data to the player terminal 50 (step D17). The team process is thus completed.

When the server system 30 has received a trial request from the player terminal 50 (step C11: YES), a trial process is performed (step C9). The team request is transmitted from the player terminal 50 when the player has selected the item "trial" on the player top screen (see FIG. 11), for example.

Figure 42:
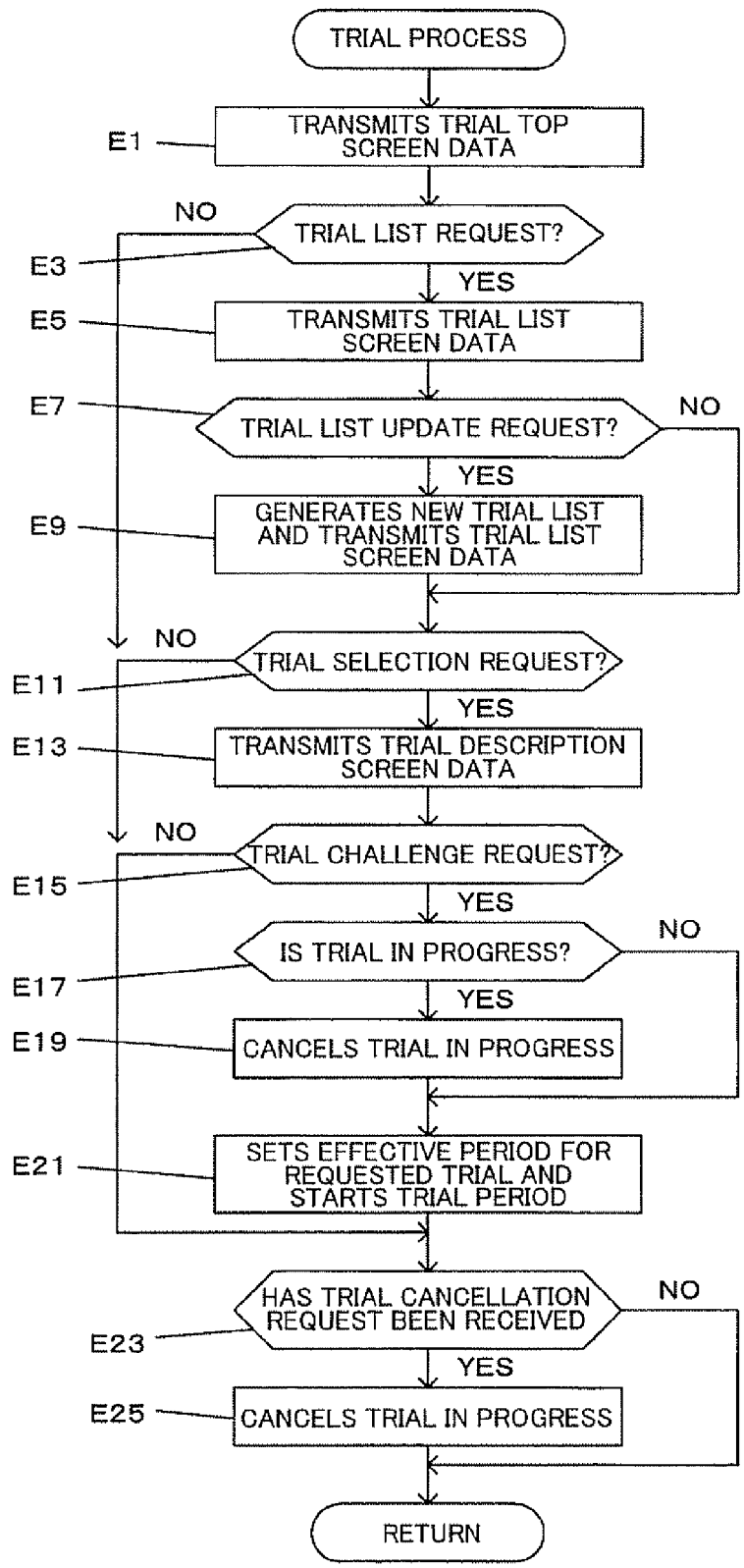
FIG. 42 is a flowchart showing a trial process executed during an HP management process.

FIG. 42 is a view illustrative of the trial process. As shown in FIG. 42, the HP management section 324 generates the screen data for displaying the trial top screen (see FIGS. 17 and 18) for the player based on the player data 342, and transmits the screen data to the player terminal 50 (step E1).

When the server system 30 has received a trial list request from the player terminal 50 (step E3: YES), the HP management section 324 generates the screen data for displaying the trial list screen (see FIG. 19) based on the player data 342, and transmits the screen data to the player terminal 50 (step E5). The trial list request is transmitted from the player terminal 50 when the player has selected the item "trial list" on the trial top screen (see FIGS. 17 and 18), for example.

When the server system 30 has received a trial list update request from the player terminal 50 (step E7: YES), the HP management section 324 generates a new trial list, generates the screen data for displaying the trial list screen, and transmits the screen data to the player terminal 50 (step E9).

When the server system 30 has received a trial selection request from the player terminal 50 (step E11: YES), the HP management section 324 generates the screen data for displaying the trial description screen (see FIGS. 20 and 21) of the corresponding trial, and transmits the screen data to the player terminal 50 (step E13). The trial selection request is transmitted from the player terminal 50 when the player has selected an arbitrary trial on the trial list screen (see FIG. 19), for example.

When the server system 30 has received a trial challenge request from the player terminal 50 (step E15: YES), whether or not a trial is currently in progress is determined. When a trial is in progress (step E17: YES), the HP management section 324 cancels the trial in progress, sets the effective period for the requested trial, and starts the trial period (step E21). When no trial is in progress (step E17: NO), the HP management section 324 sets the effective period for the requested trial, and starts the trial period (step E21).

When the server system 30 has received a trial cancellation request from the player terminal 50 (step E23: YES), the HP management section 324 cancels the trial in progress (step E25). The trial process is thus completed.

After completion of the trial process, whether or not a logout request has been received from the player terminal 50 is determined. When the logout request has not been received from the player terminal 50 (step C15: NO), the process returns to the step C7. When the logout request has been received from the player terminal 50, a logout process that allows the player to log out is performed (step C17). The HP management process is thus completed.

(B) Game Device 10

Figure 43:
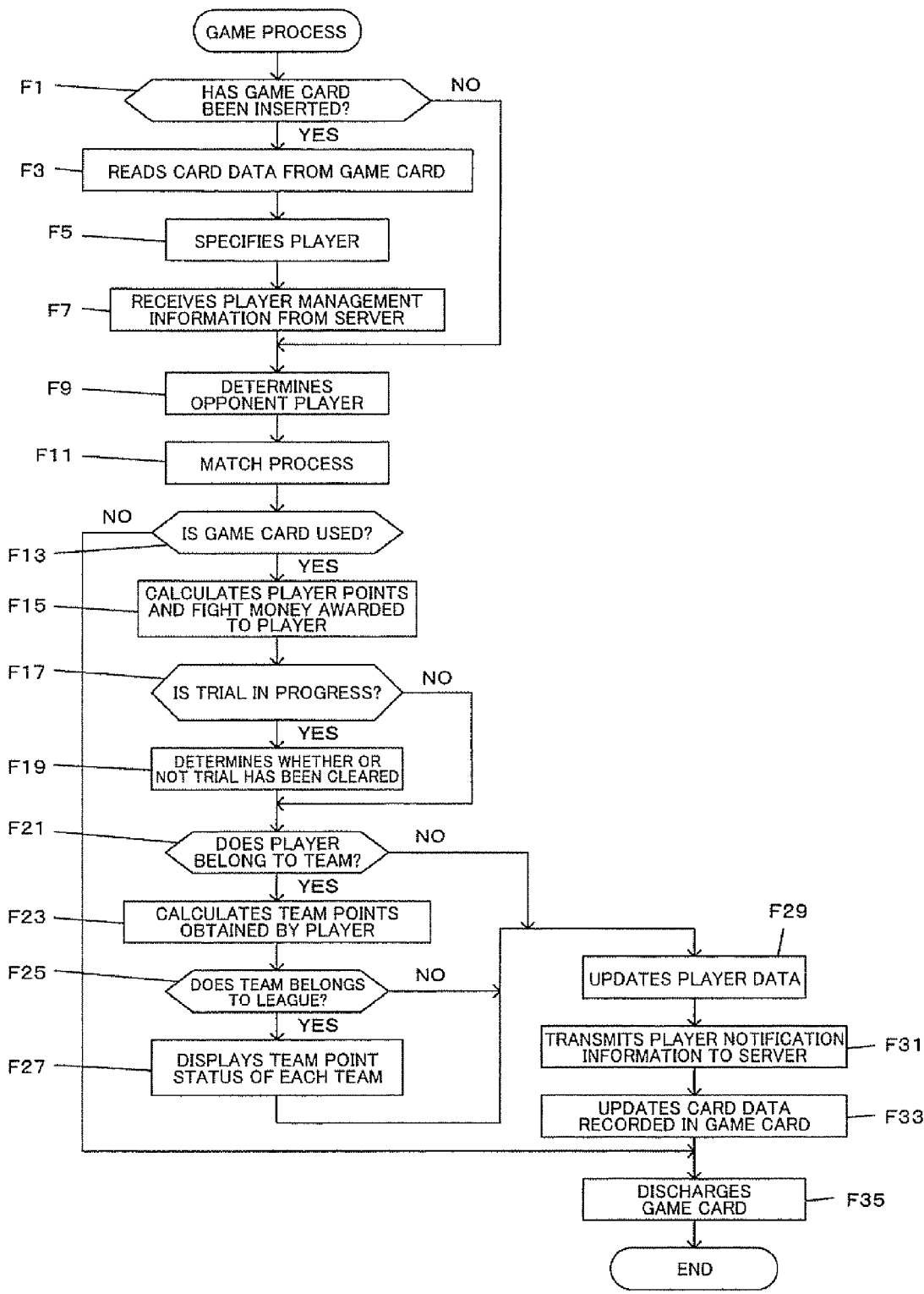
FIG. 43 is a flowchart showing a game process.

FIG. 43 is a flowchart illustrative of a game process executed by the game device 10. This process is implemented by causing the game calculation section 131 to execute the game program 171. As shown in FIG. 43, the game calculation section 131 determines whether or not the game card 20 has been inserted. When the game calculation section 131 has determined that the game card 20 has been inserted (step F1: YES), the game calculation section 131 reads the card data 21 from the game card 20 (step F3), and specifies the player based on the card data 21 (step F5). The game calculation section 131 then requests the server system 30 to transmit the player-related data relating to the specified player, and receives the player-related data transmitted from the server system 30 in response to the request (step F7). The game calculation section 131 then determines the match type (player match/CPU match) and the opponent player (step F9), and performs the match process between the player and the determined opponent player (step F11).

After completion of the match process, when the game card 20 is used (step F13: YES), the game calculation section 131 calculates the player points and fight money awarded to the player based on the match result (step F15). When a trial in progress exists (step F17: YES), the game calculation section 131 determines whether or not the trial has been cleared based on the match result (step F19).

When the player belongs to a team (step F21: YES), the game calculation section 131 calculates the team points obtained by the player based on the match result using the calculation coefficient N included in the received player-related information, a determination result as to whether or not the trial has been cleared, and the like (step F23).

When the team of the player belongs to a league (step F25: YES), the game calculation section 131 displays the team point status of each team that participates in the league series based on the interval team points of each team that participates in the league series and the calculated team points included in the received player-related information (step F27).

The game calculation section 131 then updates the player data included in the received player-related information (step F29). The game calculation section 131 transmits the updated player data and the calculated team points to the server system 30 as the player notification information (step F31).

The game calculation section 131 then updates the card data 21 recorded in the game card 20 based on the calculated player points, fight money, a determination result as to whether or not the trial has been cleared, and the like (step F33), and then causes the game card 20 to be discharged from the housing (step F35). The game calculation section 131 thus completes the game process.

Modification

Embodiments to which the invention may be applied are not limited to the above-described embodiments. Various modifications and variations may be made without departing from the spirit and scope of the invention.

(A) League Series Participation Condition

The above embodiments have been described taking an example in which a team having a team level equal to or higher than "5" can participate in the league series. Note that other conditions may be additionally provided. For example, a team point update condition is provided. Specifically, whether or not the team point update count within a given period (e.g., within one month) is equal to or more than a given number (e.g., once), or whether or not the team point update frequency within three months after the team has been formed or the team level has reached "5" is equal to or more than a given frequency (e.g., twice/month), may be specified as a condition.

(B) Calculation of Team Points

The above embodiments have been described taking an example in which the game device 10 calculates the team points obtained by the player as a result of game play. Note that the server system 30 may calculate the team points obtained by the player. Specifically, when a match has ended, the game device 10 transmits match result data including the details of the match (e.g., the type and the occurrence time of the technique performed by the player character, a temporal change in the strength value of the player character, and the time when victory or defeat has been determined) to the server system 30. The server system 30 calculates the team points based on the match result data received from the game device 10. In this case, the server system 30 must store the base point table 181 and the trial point table 183.

(C) Game System

The above embodiments have been described taking an example in which the game system has a configuration in which a plurality of game devices 10 installed in each store is connected to the server system 30. Note that another configuration may also be employed. For example the game device 10 may be a consumer game device, and the consumer game device may be connected to the server system via a communication line such as the Internet. The game device 10 may be a portable game device, a portable electronic instrument such as a PDA or a portable telephone, or a device having a communication function such as a personal computer.

(D) Type of Game

The above embodiments have been described taking an example in which the invention is applied to a fighting game. Note that the invention can also be applied to other games such as a car racing game and a quiz game.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. An information processing method implemented by a server system connected to a game device via a communication channel, the game device allowing a player to play a game, the information processing method comprising:
   receiving notification information based on game play that has been performed from the game device;
   updating player points of each player based on the received notification information, and managing the player points;
   ranking each player based on the player points;
   managing a plurality of teams including (i) storing players of each of the plurality of teams, and (ii) managing team points of each of the plurality of teams based on the notification information relating to the players of each of the plurality of teams;
   matching teams among the plurality of teams to form a plurality of groups, each of the plurality of groups being formed by a plurality of teams; and
   performing a team competition process that allows the plurality of teams of each of the plurality of groups to compete for ranking based on the notification information after each of the players has played the game, including selecting a team among the plurality of teams to participate in the team competition process depending on whether the team satisfies a given threshold condition that is based on a play frequency, wherein
   the play frequency is a frequency that the team or individuals within the team play the game within a predetermined period of time.

2. The information processing method as defined in claim 1, further comprising:
   ranking each of the plurality of teams including a team for which the team points satisfy the given threshold condition and a team for which the team points do not satisfy the given threshold condition based on the team points.

3. The information processing method as defined in claim 1,
   the managing of the plurality of teams including managing a team level of each of the plurality of teams based on ranking in each of the plurality of groups based on the team competition process; and
   teams having an identical team level being matched from the plurality of teams.

4. The information processing method as defined in claim 1,
   the team competition process being repeated at given intervals.

5. The information processing method as defined in claim 1,
   the game device including a point calculation section that calculates determination points based on game play results by a predetermined calculation process;
   the notification information including the determination points; and
   the team competition process calculating the ranking of each of the plurality of teams in each of the plurality of groups based on a sum of the determination points included in the notification information corresponding to each of the plurality of teams.

6. The information processing method as defined in claim 5,
   the game device including a condition determination section that determines whether or not a bonus point condition is satisfied based on game play and/or game play results of a player, bonus points being awarded to a team to which a player who satisfies the bonus point condition belongs;
   the point calculation section calculating the determination points by adding the bonus points to the determination points when the condition determination section has determined that the bonus point condition is satisfied; and
   the information processing method further comprising: performing a given communication with a player terminal and setting the bonus point condition for a player of the player terminal; and transmitting the set bonus point condition to the game device.

7. The information processing method as defined in claim 5, further comprising:
   selecting a team command corresponding to each of the plurality of teams from a plurality of team commands for which a success/failure relative relationship has been specified;
   setting a calculation coefficient based on the team command selected corresponding to each of the plurality of teams and the success/failure relative relationship, the calculation coefficient being used when calculating the determination points; and
   transmitting the set calculation coefficient to the game device.

8. The information processing method as defined in claim 7,
   the team command for each of the plurality of teams being selected by a majority decision of the players belonging to each of the plurality of teams based on vote signals transmitted from player terminals of the players belonging to each of the plurality of teams.

9. The information processing method as defined in claim 5,
   the team competition process including calculating a sub-total of the determination points corresponding to each of the plurality of teams at intervals shorter than the given intervals; and
   the information processing method further comprising transmitting a sum of the determination points in a latest interval corresponding to each of the plurality of teams in a group to which a team of a player identified by a received player identification signal belongs to the game device.

10. An information processing method implemented by a game device that can communicate with a server system that implements the information processing method as defined in claim 5 and allows a player to play a game, the information processing method comprising:
    calculating the determination points based on game play results by a predetermined calculation process; and
    transmitting the calculated determination points to the server system.

11. The information processing method as defined in claim 1,
    the team competition process including calculating determination points based on the notification information by a predetermined calculation process, and calculating the ranking of each of the plurality of teams in each of the plurality of groups based on a sum of the calculated determination points corresponding to each of the plurality of teams.

12. The information processing method as defined in claim 11, further comprising:
    performing a given communication with a player terminal and setting a bonus point condition for a player, bonus points being awarded to a team to which the player who satisfies the bonus point condition belongs,
    the calculating of the determination points including determining whether or not the bonus point condition is satisfied based on the received notification information, and calculating the determination points by adding the bonus point to the determination points when the bonus point condition is satisfied.

13. The information processing method as defined in claim 11, further comprising:
    selecting a team command corresponding to each of the plurality of teams from a plurality of team commands for which a success/failure relative relationship has been specified; and
    setting a calculation coefficient based on the team command selected corresponding to each of the plurality of teams and the success/failure relative relationship, the calculation coefficient being used when calculating the determination points,
    the determination points being calculated using the set calculation coefficient.

14. The information processing method as defined in claim 13, further comprising:
    receiving a vote signal transmitted from the game device, the vote signal indicating a team command selected from the plurality of team commands,
    selecting a team command that has been polled a largest number of votes by the players belonging to each of the plurality of teams as the team command for each of the plurality of teams based on the vote signal received from the game device of each of the players belonging to each of the plurality of teams.

15. A server system connected to a game device via a communication channel, the game device allowing a player to play a game, the server system comprising:
    a notification information reception section that receives notification information based on game play from the game device;
    a player point management section that updates player points of each player based on the notification information received by the notification information reception section, and manages the player points;
    a player ranking section that ranks each player based on the player points;
    a team management section that (i) manages a plurality of teams while storing players of each of the plurality of teams, and (ii) manages team points of each of the plurality of teams based on the notification information relating to the players of each of the plurality of teams; and
    a team competition processing section that (i) matches teams among the plurality of teams managed by the team management section to form a plurality of groups, each of the plurality of groups being formed by a plurality of teams, and (ii) performs a team competition process that allows the plurality of teams of each of the plurality of groups to compete for ranking based on the notification information after each of the players has played the game, the team competition processing section further selects a team among the plurality of teams to participate in the team competition process depending on whether the team satisfies a given threshold condition that is based on a play frequency, wherein the play frequency is a frequency that the team or individuals within the team play the game within a predetermined period of time.

* * * * *